(12) United States Patent
Berggren

(10) Patent No.: US 8,451,938 B2
(45) Date of Patent: May 28, 2013

(54) METHOD AND APPARATUS OF TELECOMMUNICATIONS

(75) Inventor: Fredrik Berggren, Väsby (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 13/023,220

(22) Filed: Feb. 8, 2011

(65) Prior Publication Data

US 2011/0194642 A1 Aug. 11, 2011

Related U.S. Application Data

(63) Continuation of application No. PCT/CN2008/071936, filed on Aug. 8, 2008.

(51) Int. Cl.
*H04W 4/00* (2009.01)

(52) U.S. Cl.
USPC .......................................... 375/295; 370/350

(58) Field of Classification Search
USPC ............ 375/260, 295; 370/324, 350; 455/507
See application file for complete search history.

(56) References Cited

U.S. PATENT DOCUMENTS

| | | | |
|---|---|---|---|
| 2008/0273522 A1* | 11/2008 | Luo et al. | 370/350 |
| 2008/0291892 A1* | 11/2008 | Luo | 370/350 |
| 2009/0010312 A1* | 1/2009 | Han et al. | 375/145 |
| 2009/0046702 A1* | 2/2009 | Luo et al. | 370/350 |
| 2009/0080407 A1* | 3/2009 | Onggosanusi et al. | 370/350 |
| 2009/0135803 A1* | 5/2009 | Luo et al. | 370/350 |
| 2011/0098070 A1 | 4/2011 | Han et al. | |

FOREIGN PATENT DOCUMENTS

| | | |
|---|---|---|
| CN | 1722637 A | 1/2006 |
| EP | 2197133 A1 | 6/2010 |
| JP | 11346158 A | 12/1999 |
| WO | WO 2008/048056 A1 | 4/2008 |

OTHER PUBLICATIONS

R1-071027, "S-SCH sequence design", 3GPP TSG-RAN WG 1 Meeting#48, Ericsson, Feb. 2007.*
R1-074502, SSC mapping and scrambling method, 3GPP TSG RAN WG1 #50 bis, LG Electronics, Shanghai, China, Oct. 8-12, 2007.*
R1-074485, SSCH Mapping to Group ID and Frame Timing,3GPP TSG RAN WG1 #50 bis, Marvell Semiconductor, Shanghai, China, Oct. 8-12, 2007.*
R1-074498, Way Forward for Secondary SCH Mapping and Scrambling,3GPP TSG RAN WG1 #50 bis, Texas Instruments, Motorola, Huawei, LG Electronics, Nortel, Qualcomm Europe, Sharp, ETRI, Shanghai, China, Oct. 8-12, 2007.*
Extended European Search Report issued in corresponding European Patent Application No. 08783929.6, mailed Aug. 16, 2011.
International Search Report and Written Opinion of the International Searching Authority issued in corresponding PCT Patent Application No. PCT/CN2008/071936, mailed May 14, 2009.

(Continued)

*Primary Examiner* — Aristocratis Fotakis

(74) *Attorney, Agent, or Firm* — Brinks Hofer Gilson & Lione

(57) ABSTRACT

Generating codewords and determining an information symbol from a codeword for transmission in a telecommunication system is disclosed. The method and apparatus provided by the embodiments of the invention allow up to a maximum number of codewords to be generated given the code alphabet size. Embodiments of the invention also provide method and apparatus for determining an information symbol from a codeword.

17 Claims, 20 Drawing Sheets

OTHER PUBLICATIONS

Texas Instruments, "Secondary SCH Mapping and Scrambling" 6.2.6, 3GPP TSG RAN WG1 50 bis, Shanghai, China Oct. 8-12, 2007. R1-074143.

NTT Docomo et al., "S-SCH Structure for E-UTRA Downlink" 5.2, 3GPP TSG WG1 Meeting #49bis. Orlando, Florida Jun. 25-29, 2007. R1-072941.

Qualcomm Europe, "Details on SSC Sequence Design" 5.2, 3GPP TSG-RAN WG1 #49bis. Orlando, USA Jun. 25-29, 2007.

3rd Generation Partnership Project, "Technical Specification Group Radio Access Network; Evolved Universal Terrestrial Radio Access (E-UTRA); Physical Channels and Modulation" (Release 8), 3GPP TS 36.211, V8.3.0, May 2008.

* cited by examiner

| $X$ | 0 | 1 | 2 | 3 | 4 | 5 | 6 | 7 | 8 | 9 |
|---|---|---|---|---|---|---|---|---|---|---|
| $m_0$ | 0 | 1 | 2 | 3 | 0 | 1 | 2 | 0 | 1 | 0 |
| $m_1$ | 1 | 2 | 3 | 4 | 2 | 3 | 4 | 3 | 4 | 4 |

| $X$ | 0 | 1 | 2 | 3 | 4 | 5 | 6 | 7 | 8 | 9 |
|---|---|---|---|---|---|---|---|---|---|---|
| $m_0$ | 3 | 2 | 1 | 0 | 2 | 1 | 0 | 1 | 0 | 0 |
| $m_1$ | 4 | 3 | 2 | 1 | 4 | 3 | 2 | 4 | 3 | 4 |

Figure 9

| $X$ | 0 | 1 | 2 | 3 | 4 | 5 | 6 | 7 | 8 | 9 |
|---|---|---|---|---|---|---|---|---|---|---|
| $m_0$ | 0 | 1 | 2 | 3 | 2 | 1 | 0 | 0 | 1 | 0 |
| $m_1$ | 1 | 2 | 3 | 4 | 4 | 3 | 2 | 3 | 4 | 4 |

Figure 10

| $X$ | 0 | 1 | 2 | 3 | 4 | 5 | 6 | 7 | 8 | 9 |
|---|---|---|---|---|---|---|---|---|---|---|
| $m_0$ | 3 | 2 | 1 | 0 | 0 | 1 | 2 | 1 | 0 | 0 |
| $m_1$ | 4 | 3 | 2 | 1 | 2 | 3 | 4 | 4 | 3 | 4 |

Figure 11

| $X$ | $m_0$ | $m_1$ | $X$ | $m_0$ | $m_1$ | $X$ | $m_0$ | $m_1$ | $X$ | $m_0$ | $m_1$ | $X$ | $m_0$ | $m_1$ |
|---|---|---|---|---|---|---|---|---|---|---|---|---|---|---|
| 0 | 0 | 1 | 37 | 7 | 9 | 74 | 15 | 18 | 111 | 24 | 28 | 148 | 8 | 14 |
| 1 | 1 | 2 | 38 | 8 | 10 | 75 | 16 | 19 | 112 | 25 | 29 | 149 | 9 | 15 |
| 2 | 2 | 3 | 39 | 9 | 11 | 76 | 17 | 20 | 113 | 26 | 30 | 150 | 10 | 16 |
| 3 | 3 | 4 | 40 | 10 | 12 | 77 | 18 | 21 | 114 | 0 | 5 | 151 | 11 | 17 |
| 4 | 4 | 5 | 41 | 11 | 13 | 78 | 19 | 22 | 115 | 1 | 6 | 152 | 12 | 18 |
| 5 | 5 | 6 | 42 | 12 | 14 | 79 | 20 | 23 | 116 | 2 | 7 | 153 | 13 | 19 |
| 6 | 6 | 7 | 43 | 13 | 15 | 80 | 21 | 24 | 117 | 3 | 8 | 154 | 14 | 20 |
| 7 | 7 | 8 | 44 | 14 | 16 | 81 | 22 | 25 | 118 | 4 | 9 | 155 | 15 | 21 |
| 8 | 8 | 9 | 45 | 15 | 17 | 82 | 23 | 26 | 119 | 5 | 10 | 156 | 16 | 22 |
| 9 | 9 | 10 | 46 | 16 | 18 | 83 | 24 | 27 | 120 | 6 | 11 | 157 | 17 | 23 |
| 10 | 10 | 11 | 47 | 17 | 19 | 84 | 25 | 28 | 121 | 7 | 12 | 158 | 18 | 24 |
| 11 | 11 | 12 | 48 | 18 | 20 | 85 | 26 | 29 | 122 | 8 | 13 | 159 | 19 | 25 |
| 12 | 12 | 13 | 49 | 19 | 21 | 86 | 27 | 30 | 123 | 9 | 14 | 160 | 20 | 26 |
| 13 | 13 | 14 | 50 | 20 | 22 | 87 | 0 | 4 | 124 | 10 | 15 | 161 | 21 | 27 |
| 14 | 14 | 15 | 51 | 21 | 23 | 88 | 1 | 5 | 125 | 11 | 16 | 162 | 22 | 28 |
| 15 | 15 | 16 | 52 | 22 | 24 | 89 | 2 | 6 | 126 | 12 | 17 | 163 | 23 | 29 |
| 16 | 16 | 17 | 53 | 23 | 25 | 90 | 3 | 7 | 127 | 13 | 18 | 164 | 24 | 30 |
| 17 | 17 | 18 | 54 | 24 | 26 | 91 | 4 | 8 | 128 | 14 | 19 | 165 | 0 | 7 |
| 18 | 18 | 19 | 55 | 25 | 27 | 92 | 5 | 9 | 129 | 15 | 20 | 166 | 1 | 8 |
| 19 | 19 | 20 | 56 | 26 | 28 | 93 | 6 | 10 | 130 | 16 | 21 | 167 | 2 | 9 |
| 20 | 20 | 21 | 57 | 27 | 29 | 94 | 7 | 11 | 131 | 17 | 22 | 168 | 3 | 10 |
| 21 | 21 | 22 | 58 | 28 | 30 | 95 | 8 | 12 | 132 | 18 | 23 | 169 | 4 | 11 |
| 22 | 22 | 23 | 59 | 0 | 3 | 96 | 9 | 13 | 133 | 19 | 24 | 170 | 5 | 12 |
| 23 | 23 | 24 | 60 | 1 | 4 | 97 | 10 | 14 | 134 | 20 | 25 | 171 | 6 | 13 |
| 24 | 24 | 25 | 61 | 2 | 5 | 98 | 11 | 15 | 135 | 21 | 26 | 172 | 7 | 14 |
| 25 | 25 | 26 | 62 | 3 | 6 | 99 | 12 | 16 | 136 | 22 | 27 | 173 | 8 | 15 |
| 26 | 26 | 27 | 63 | 4 | 7 | 100 | 13 | 17 | 137 | 23 | 28 | 174 | 9 | 16 |
| 27 | 27 | 28 | 64 | 5 | 8 | 101 | 14 | 18 | 138 | 24 | 29 | 175 | 10 | 17 |
| 28 | 28 | 29 | 65 | 6 | 9 | 102 | 15 | 19 | 139 | 25 | 30 | 176 | 11 | 18 |
| 29 | 29 | 30 | 66 | 7 | 10 | 103 | 16 | 20 | 140 | 0 | 6 | 177 | 12 | 19 |
| 30 | 0 | 2 | 67 | 8 | 11 | 104 | 17 | 21 | 141 | 1 | 7 | 178 | 13 | 20 |
| 31 | 1 | 3 | 68 | 9 | 12 | 105 | 18 | 22 | 142 | 2 | 8 | 179 | 14 | 21 |
| 32 | 2 | 4 | 69 | 10 | 13 | 106 | 19 | 23 | 143 | 3 | 9 | 180 | 15 | 22 |
| 33 | 3 | 5 | 70 | 11 | 14 | 107 | 20 | 24 | 144 | 4 | 10 | 181 | 16 | 23 |
| 34 | 4 | 6 | 71 | 12 | 15 | 108 | 21 | 25 | 145 | 5 | 11 | 182 | 17 | 24 |
| 35 | 5 | 7 | 72 | 13 | 16 | 109 | 22 | 26 | 146 | 6 | 12 | 183 | 18 | 25 |
| 36 | 6 | 8 | 73 | 14 | 17 | 110 | 23 | 27 | 147 | 7 | 13 | 184 | 19 | 26 |

Figure 12a

| $X$ | $m_0$ | $m_1$ | $X$ | $m_0$ | $m_1$ | $X$ | $m_0$ | $m_1$ | $X$ | $m_0$ | $m_1$ | $X$ | $m_0$ | $m_1$ |
|---|---|---|---|---|---|---|---|---|---|---|---|---|---|---|
| 185 | 20 | 27 | 222 | 10 | 19 | 259 | 4 | 15 | 296 | 2 | 15 | 333 | 4 | 19 |
| 186 | 21 | 28 | 223 | 11 | 20 | 260 | 5 | 16 | 297 | 3 | 16 | 334 | 5 | 20 |
| 187 | 22 | 29 | 224 | 12 | 21 | 261 | 6 | 17 | 298 | 4 | 17 | 335 | 6 | 21 |
| 188 | 23 | 30 | 225 | 13 | 22 | 262 | 7 | 18 | 299 | 5 | 18 | 336 | 7 | 22 |
| 189 | 0 | 8 | 226 | 14 | 23 | 263 | 8 | 19 | 300 | 6 | 19 | 337 | 8 | 23 |
| 190 | 1 | 9 | 227 | 15 | 24 | 264 | 9 | 20 | 301 | 7 | 20 | 338 | 9 | 24 |
| 191 | 2 | 10 | 228 | 16 | 25 | 265 | 10 | 21 | 302 | 8 | 21 | 339 | 10 | 25 |
| 192 | 3 | 11 | 229 | 17 | 26 | 266 | 11 | 22 | 303 | 9 | 22 | 340 | 11 | 26 |
| 193 | 4 | 12 | 230 | 18 | 27 | 267 | 12 | 23 | 304 | 10 | 23 | 341 | 12 | 27 |
| 194 | 5 | 13 | 231 | 19 | 28 | 268 | 13 | 24 | 305 | 11 | 24 | 342 | 13 | 28 |
| 195 | 6 | 14 | 232 | 20 | 29 | 269 | 14 | 25 | 306 | 12 | 25 | 343 | 14 | 29 |
| 196 | 7 | 15 | 233 | 21 | 30 | 270 | 15 | 26 | 307 | 13 | 26 | 344 | 15 | 30 |
| 197 | 8 | 16 | 234 | 0 | 10 | 271 | 16 | 27 | 308 | 14 | 27 | 345 | 0 | 16 |
| 198 | 9 | 17 | 235 | 1 | 11 | 272 | 17 | 28 | 309 | 15 | 28 | 346 | 1 | 17 |
| 199 | 10 | 18 | 236 | 2 | 12 | 273 | 18 | 29 | 310 | 16 | 29 | 347 | 2 | 18 |
| 200 | 11 | 19 | 237 | 3 | 13 | 274 | 19 | 30 | 311 | 17 | 30 | 348 | 3 | 19 |
| 201 | 12 | 20 | 238 | 4 | 14 | 275 | 0 | 12 | 312 | 0 | 14 | 349 | 4 | 20 |
| 202 | 13 | 21 | 239 | 5 | 15 | 276 | 1 | 13 | 313 | 1 | 15 | 350 | 5 | 21 |
| 203 | 14 | 22 | 240 | 6 | 16 | 277 | 2 | 14 | 314 | 2 | 16 | 351 | 6 | 22 |
| 204 | 15 | 23 | 241 | 7 | 17 | 278 | 3 | 15 | 315 | 3 | 17 | 352 | 7 | 23 |
| 205 | 16 | 24 | 242 | 8 | 18 | 279 | 4 | 16 | 316 | 4 | 18 | 353 | 8 | 24 |
| 206 | 17 | 25 | 243 | 9 | 19 | 280 | 5 | 17 | 317 | 5 | 19 | 354 | 9 | 25 |
| 207 | 18 | 26 | 244 | 10 | 20 | 281 | 6 | 18 | 318 | 6 | 20 | 355 | 10 | 26 |
| 208 | 19 | 27 | 245 | 11 | 21 | 282 | 7 | 19 | 319 | 7 | 21 | 356 | 11 | 27 |
| 209 | 20 | 28 | 246 | 12 | 22 | 283 | 8 | 20 | 320 | 8 | 22 | 357 | 12 | 28 |
| 210 | 21 | 29 | 247 | 13 | 23 | 284 | 9 | 21 | 321 | 9 | 23 | 358 | 13 | 29 |
| 211 | 22 | 30 | 248 | 14 | 24 | 285 | 10 | 22 | 322 | 10 | 24 | 359 | 14 | 30 |
| 212 | 0 | 9 | 249 | 15 | 25 | 286 | 11 | 23 | 323 | 11 | 25 | 360 | 0 | 17 |
| 213 | 1 | 10 | 250 | 16 | 26 | 287 | 12 | 24 | 324 | 12 | 26 | 361 | 1 | 18 |
| 214 | 2 | 11 | 251 | 17 | 27 | 288 | 13 | 25 | 325 | 13 | 27 | 362 | 2 | 19 |
| 215 | 3 | 12 | 252 | 18 | 28 | 289 | 14 | 26 | 326 | 14 | 28 | 363 | 3 | 20 |
| 216 | 4 | 13 | 253 | 19 | 29 | 290 | 15 | 27 | 327 | 15 | 29 | 364 | 4 | 21 |
| 217 | 5 | 14 | 254 | 20 | 30 | 291 | 16 | 28 | 328 | 16 | 30 | 365 | 5 | 22 |
| 218 | 6 | 15 | 255 | 0 | 11 | 292 | 17 | 29 | 329 | 0 | 15 | 366 | 6 | 23 |
| 219 | 7 | 16 | 256 | 1 | 12 | 293 | 18 | 30 | 330 | 1 | 16 | 367 | 7 | 24 |
| 220 | 8 | 17 | 257 | 2 | 13 | 294 | 0 | 13 | 331 | 2 | 17 | 368 | 8 | 25 |
| 221 | 9 | 18 | 258 | 3 | 14 | 295 | 1 | 14 | 332 | 3 | 18 | 369 | 9 | 26 |

Figure 12b

| $X$ | $m_0$ | $m_1$ | $X$ | $m_0$ | $m_1$ | $X$ | $m_0$ | $m_1$ | $X$ | $m_0$ | $m_1$ | $X$ | $m_0$ | $m_1$ |
|---|---|---|---|---|---|---|---|---|---|---|---|---|---|---|
| 370 | 10 | 27 | 389 | 2 | 21 | 408 | 9 | 29 | 427 | 7 | 29 | 446 | 2 | 27 |
| 371 | 11 | 28 | 390 | 3 | 22 | 409 | 10 | 30 | 428 | 8 | 30 | 447 | 3 | 28 |
| 372 | 12 | 29 | 391 | 4 | 23 | 410 | 0 | 21 | 429 | 0 | 23 | 448 | 4 | 29 |
| 373 | 13 | 30 | 392 | 5 | 24 | 411 | 1 | 22 | 430 | 1 | 24 | 449 | 5 | 30 |
| 374 | 0 | 18 | 393 | 6 | 25 | 412 | 2 | 23 | 431 | 2 | 25 | 450 | 0 | 26 |
| 375 | 1 | 19 | 394 | 7 | 26 | 413 | 3 | 24 | 432 | 3 | 26 | 451 | 1 | 27 |
| 376 | 2 | 20 | 395 | 8 | 27 | 414 | 4 | 25 | 433 | 4 | 27 | 452 | 2 | 28 |
| 377 | 3 | 21 | 396 | 9 | 28 | 415 | 5 | 26 | 434 | 5 | 28 | 453 | 3 | 29 |
| 378 | 4 | 22 | 397 | 10 | 29 | 416 | 6 | 27 | 435 | 6 | 29 | 454 | 4 | 30 |
| 379 | 5 | 23 | 398 | 11 | 30 | 417 | 7 | 28 | 436 | 7 | 30 | 455 | 0 | 27 |
| 380 | 6 | 24 | 399 | 0 | 20 | 418 | 8 | 29 | 437 | 0 | 24 | 456 | 1 | 28 |
| 381 | 7 | 25 | 400 | 1 | 21 | 419 | 9 | 30 | 438 | 1 | 25 | 457 | 2 | 29 |
| 382 | 8 | 26 | 401 | 2 | 22 | 420 | 0 | 22 | 439 | 2 | 26 | 458 | 3 | 30 |
| 383 | 9 | 27 | 402 | 3 | 23 | 421 | 1 | 23 | 440 | 3 | 27 | 459 | 0 | 28 |
| 384 | 10 | 28 | 403 | 4 | 24 | 422 | 2 | 24 | 441 | 4 | 28 | 460 | 1 | 29 |
| 385 | 11 | 29 | 404 | 5 | 25 | 423 | 3 | 25 | 442 | 5 | 29 | 461 | 2 | 30 |
| 386 | 12 | 30 | 405 | 6 | 26 | 424 | 4 | 26 | 443 | 6 | 30 | 462 | 0 | 29 |
| 387 | 0 | 19 | 406 | 7 | 27 | 425 | 5 | 27 | 444 | 0 | 25 | 463 | 1 | 30 |
| 388 | 1 | 20 | 407 | 8 | 28 | 426 | 6 | 28 | 445 | 1 | 26 | 464 | 0 | 30 |

Figure 12c

| X | $m_0$ | $m_1$ | X | $m_0$ | $m_1$ | X | $m_0$ | $m_1$ | X | $m_0$ | $m_1$ | X | $m_0$ | $m_1$ |
|---|---|---|---|---|---|---|---|---|---|---|---|---|---|---|
| 0 | 29 | 30 | 37 | 21 | 23 | 74 | 12 | 15 | 111 | 2 | 6 | 148 | 16 | 22 |
| 1 | 28 | 29 | 38 | 20 | 22 | 75 | 11 | 14 | 112 | 1 | 5 | 149 | 15 | 21 |
| 2 | 27 | 28 | 39 | 19 | 21 | 76 | 10 | 13 | 113 | 0 | 4 | 150 | 14 | 20 |
| 3 | 26 | 27 | 40 | 18 | 20 | 77 | 9 | 12 | 114 | 25 | 30 | 151 | 13 | 19 |
| 4 | 25 | 26 | 41 | 17 | 19 | 78 | 8 | 11 | 115 | 24 | 29 | 152 | 12 | 18 |
| 5 | 24 | 25 | 42 | 16 | 18 | 79 | 7 | 10 | 116 | 23 | 28 | 153 | 11 | 17 |
| 6 | 23 | 24 | 43 | 15 | 17 | 80 | 6 | 9 | 117 | 22 | 27 | 154 | 10 | 16 |
| 7 | 22 | 23 | 44 | 14 | 16 | 81 | 5 | 8 | 118 | 21 | 26 | 155 | 9 | 15 |
| 8 | 21 | 22 | 45 | 13 | 15 | 82 | 4 | 7 | 119 | 20 | 25 | 156 | 8 | 14 |
| 9 | 20 | 21 | 46 | 12 | 14 | 83 | 3 | 6 | 120 | 19 | 24 | 157 | 7 | 13 |
| 10 | 19 | 20 | 47 | 11 | 13 | 84 | 2 | 5 | 121 | 18 | 23 | 158 | 6 | 12 |
| 11 | 18 | 19 | 48 | 10 | 12 | 85 | 1 | 4 | 122 | 17 | 22 | 159 | 5 | 11 |
| 12 | 17 | 18 | 49 | 9 | 11 | 86 | 0 | 3 | 123 | 16 | 21 | 160 | 4 | 10 |
| 13 | 16 | 17 | 50 | 8 | 10 | 87 | 26 | 30 | 124 | 15 | 20 | 161 | 3 | 9 |
| 14 | 15 | 16 | 51 | 7 | 9 | 88 | 25 | 29 | 125 | 14 | 19 | 162 | 2 | 8 |
| 15 | 14 | 15 | 52 | 6 | 8 | 89 | 24 | 28 | 126 | 13 | 18 | 163 | 1 | 7 |
| 16 | 13 | 14 | 53 | 5 | 7 | 90 | 23 | 27 | 127 | 12 | 17 | 164 | 0 | 6 |
| 17 | 12 | 13 | 54 | 4 | 6 | 91 | 22 | 26 | 128 | 11 | 16 | 165 | 23 | 30 |
| 18 | 11 | 12 | 55 | 3 | 5 | 92 | 21 | 25 | 129 | 10 | 15 | 166 | 22 | 29 |
| 19 | 10 | 11 | 56 | 2 | 4 | 93 | 20 | 24 | 130 | 9 | 14 | 167 | 21 | 28 |
| 20 | 9 | 10 | 57 | 1 | 3 | 94 | 19 | 23 | 131 | 8 | 13 | 168 | 20 | 27 |
| 21 | 8 | 9 | 58 | 0 | 2 | 95 | 18 | 22 | 132 | 7 | 12 | 169 | 19 | 26 |
| 22 | 7 | 8 | 59 | 27 | 30 | 96 | 17 | 21 | 133 | 6 | 11 | 170 | 18 | 25 |
| 23 | 6 | 7 | 60 | 26 | 29 | 97 | 16 | 20 | 134 | 5 | 10 | 171 | 17 | 24 |
| 24 | 5 | 6 | 61 | 25 | 28 | 98 | 15 | 19 | 135 | 4 | 9 | 172 | 16 | 23 |
| 25 | 4 | 5 | 62 | 24 | 27 | 99 | 14 | 18 | 136 | 3 | 8 | 173 | 15 | 22 |
| 26 | 3 | 4 | 63 | 23 | 26 | 100 | 13 | 17 | 137 | 2 | 7 | 174 | 14 | 21 |
| 27 | 2 | 3 | 64 | 22 | 25 | 101 | 12 | 16 | 138 | 1 | 6 | 175 | 13 | 20 |
| 28 | 1 | 2 | 65 | 21 | 24 | 102 | 11 | 15 | 139 | 0 | 5 | 176 | 12 | 19 |
| 29 | 0 | 1 | 66 | 20 | 23 | 103 | 10 | 14 | 140 | 24 | 30 | 177 | 11 | 18 |
| 30 | 28 | 30 | 67 | 19 | 22 | 104 | 9 | 13 | 141 | 23 | 29 | 178 | 10 | 17 |
| 31 | 27 | 29 | 68 | 18 | 21 | 105 | 8 | 12 | 142 | 22 | 28 | 179 | 9 | 16 |
| 32 | 26 | 28 | 69 | 17 | 20 | 106 | 7 | 11 | 143 | 21 | 27 | 180 | 8 | 15 |
| 33 | 25 | 27 | 70 | 16 | 19 | 107 | 6 | 10 | 144 | 20 | 26 | 181 | 7 | 14 |
| 34 | 24 | 26 | 71 | 15 | 18 | 108 | 5 | 9 | 145 | 19 | 25 | 182 | 6 | 13 |
| 35 | 23 | 25 | 72 | 14 | 17 | 109 | 4 | 8 | 146 | 18 | 24 | 183 | 5 | 12 |
| 36 | 22 | 24 | 73 | 13 | 16 | 110 | 3 | 7 | 147 | 17 | 23 | 184 | 4 | 11 |

Figure 13a

| X | $m_0$ | $m_1$ | X | $m_0$ | $m_1$ | X | $m_0$ | $m_1$ | X | $m_0$ | $m_1$ | X | $m_0$ | $m_1$ |
|---|---|---|---|---|---|---|---|---|---|---|---|---|---|---|
| 185 | 3 | 10 | 222 | 11 | 20 | 259 | 15 | 26 | 296 | 15 | 28 | 333 | 11 | 26 |
| 186 | 2 | 9 | 223 | 10 | 19 | 260 | 14 | 25 | 297 | 14 | 27 | 334 | 10 | 25 |
| 187 | 1 | 8 | 224 | 9 | 18 | 261 | 13 | 24 | 298 | 13 | 26 | 335 | 9 | 24 |
| 188 | 0 | 7 | 225 | 8 | 17 | 262 | 12 | 23 | 299 | 12 | 25 | 336 | 8 | 23 |
| 189 | 22 | 30 | 226 | 7 | 16 | 263 | 11 | 22 | 300 | 11 | 24 | 337 | 7 | 22 |
| 190 | 21 | 29 | 227 | 6 | 15 | 264 | 10 | 21 | 301 | 10 | 23 | 338 | 6 | 21 |
| 191 | 20 | 28 | 228 | 5 | 14 | 265 | 9 | 20 | 302 | 9 | 22 | 339 | 5 | 20 |
| 192 | 19 | 27 | 229 | 4 | 13 | 266 | 8 | 19 | 303 | 8 | 21 | 340 | 4 | 19 |
| 193 | 18 | 26 | 230 | 3 | 12 | 267 | 7 | 18 | 304 | 7 | 20 | 341 | 3 | 18 |
| 194 | 17 | 25 | 231 | 2 | 11 | 268 | 6 | 17 | 305 | 6 | 19 | 342 | 2 | 17 |
| 195 | 16 | 24 | 232 | 1 | 10 | 269 | 5 | 16 | 306 | 5 | 18 | 343 | 1 | 16 |
| 196 | 15 | 23 | 233 | 0 | 9 | 270 | 4 | 15 | 307 | 4 | 17 | 344 | 0 | 15 |
| 197 | 14 | 22 | 234 | 20 | 30 | 271 | 3 | 14 | 308 | 3 | 16 | 345 | 14 | 30 |
| 198 | 13 | 21 | 235 | 19 | 29 | 272 | 2 | 13 | 309 | 2 | 15 | 346 | 13 | 29 |
| 199 | 12 | 20 | 236 | 18 | 28 | 273 | 1 | 12 | 310 | 1 | 14 | 347 | 12 | 28 |
| 200 | 11 | 19 | 237 | 17 | 27 | 274 | 0 | 11 | 311 | 0 | 13 | 348 | 11 | 27 |
| 201 | 10 | 18 | 238 | 16 | 26 | 275 | 18 | 30 | 312 | 16 | 30 | 349 | 10 | 26 |
| 202 | 9 | 17 | 239 | 15 | 25 | 276 | 17 | 29 | 313 | 15 | 29 | 350 | 9 | 25 |
| 203 | 8 | 16 | 240 | 14 | 24 | 277 | 16 | 28 | 314 | 14 | 28 | 351 | 8 | 24 |
| 204 | 7 | 15 | 241 | 13 | 23 | 278 | 15 | 27 | 315 | 13 | 27 | 352 | 7 | 23 |
| 205 | 6 | 14 | 242 | 12 | 22 | 279 | 14 | 26 | 316 | 12 | 26 | 353 | 6 | 22 |
| 206 | 5 | 13 | 243 | 11 | 21 | 280 | 13 | 25 | 317 | 11 | 25 | 354 | 5 | 21 |
| 207 | 4 | 12 | 244 | 10 | 20 | 281 | 12 | 24 | 318 | 10 | 24 | 355 | 4 | 20 |
| 208 | 3 | 11 | 245 | 9 | 19 | 282 | 11 | 23 | 319 | 9 | 23 | 356 | 3 | 19 |
| 209 | 2 | 10 | 246 | 8 | 18 | 283 | 10 | 22 | 320 | 8 | 22 | 357 | 2 | 18 |
| 210 | 1 | 9 | 247 | 7 | 17 | 284 | 9 | 21 | 321 | 7 | 21 | 358 | 1 | 17 |
| 211 | 0 | 8 | 248 | 6 | 16 | 285 | 8 | 20 | 322 | 6 | 20 | 359 | 0 | 16 |
| 212 | 21 | 30 | 249 | 5 | 15 | 286 | 7 | 19 | 323 | 5 | 19 | 360 | 13 | 30 |
| 213 | 20 | 29 | 250 | 4 | 14 | 287 | 6 | 18 | 324 | 4 | 18 | 361 | 12 | 29 |
| 214 | 19 | 28 | 251 | 3 | 13 | 288 | 5 | 17 | 325 | 3 | 17 | 362 | 11 | 28 |
| 215 | 18 | 27 | 252 | 2 | 12 | 289 | 4 | 16 | 326 | 2 | 16 | 363 | 10 | 27 |
| 216 | 17 | 26 | 253 | 1 | 11 | 290 | 3 | 15 | 327 | 1 | 15 | 364 | 9 | 26 |
| 217 | 16 | 25 | 254 | 0 | 10 | 291 | 2 | 14 | 328 | 0 | 14 | 365 | 8 | 25 |
| 218 | 15 | 24 | 255 | 19 | 30 | 292 | 1 | 13 | 329 | 15 | 30 | 366 | 7 | 24 |
| 219 | 14 | 23 | 256 | 18 | 29 | 293 | 0 | 12 | 330 | 14 | 29 | 367 | 6 | 23 |
| 220 | 13 | 22 | 257 | 17 | 28 | 294 | 17 | 30 | 331 | 13 | 28 | 368 | 5 | 22 |
| 221 | 12 | 21 | 258 | 16 | 27 | 295 | 16 | 29 | 332 | 12 | 27 | 369 | 4 | 21 |

Figure 13b

| X | $m_0$ | $m_1$ | X | $m_0$ | $m_1$ | X | $m_0$ | $m_1$ | X | $m_0$ | $m_1$ | X | $m_0$ | $m_1$ |
|---|---|---|---|---|---|---|---|---|---|---|---|---|---|---|
| 370 | 3 | 20 | 389 | 9 | 28 | 408 | 1 | 21 | 427 | 1 | 23 | 446 | 3 | 28 |
| 371 | 2 | 19 | 390 | 8 | 27 | 409 | 0 | 20 | 428 | 0 | 22 | 447 | 2 | 27 |
| 372 | 1 | 18 | 391 | 7 | 26 | 410 | 9 | 30 | 429 | 7 | 30 | 448 | 1 | 26 |
| 373 | 0 | 17 | 392 | 6 | 25 | 411 | 8 | 29 | 430 | 6 | 29 | 449 | 0 | 25 |
| 374 | 12 | 30 | 393 | 5 | 24 | 412 | 7 | 28 | 431 | 5 | 28 | 450 | 4 | 30 |
| 375 | 11 | 29 | 394 | 4 | 23 | 413 | 6 | 27 | 432 | 4 | 27 | 451 | 3 | 29 |
| 376 | 10 | 28 | 395 | 3 | 22 | 414 | 5 | 26 | 433 | 3 | 26 | 452 | 2 | 28 |
| 377 | 9 | 27 | 396 | 2 | 21 | 415 | 4 | 25 | 434 | 2 | 25 | 453 | 1 | 27 |
| 378 | 8 | 26 | 397 | 1 | 20 | 416 | 3 | 24 | 435 | 1 | 24 | 454 | 0 | 26 |
| 379 | 7 | 25 | 398 | 0 | 19 | 417 | 2 | 23 | 436 | 0 | 23 | 455 | 3 | 30 |
| 380 | 6 | 24 | 399 | 10 | 30 | 418 | 1 | 22 | 437 | 6 | 30 | 456 | 2 | 29 |
| 381 | 5 | 23 | 400 | 9 | 29 | 419 | 0 | 21 | 438 | 5 | 29 | 457 | 1 | 28 |
| 382 | 4 | 22 | 401 | 8 | 28 | 420 | 8 | 30 | 439 | 4 | 28 | 458 | 0 | 27 |
| 383 | 3 | 21 | 402 | 7 | 27 | 421 | 7 | 29 | 440 | 3 | 27 | 459 | 2 | 30 |
| 384 | 2 | 20 | 403 | 6 | 26 | 422 | 6 | 28 | 441 | 2 | 26 | 460 | 1 | 29 |
| 385 | 1 | 19 | 404 | 5 | 25 | 423 | 5 | 27 | 442 | 1 | 25 | 461 | 0 | 28 |
| 386 | 0 | 18 | 405 | 4 | 24 | 424 | 4 | 26 | 443 | 0 | 24 | 462 | 1 | 30 |
| 387 | 11 | 30 | 406 | 3 | 23 | 425 | 3 | 25 | 444 | 5 | 30 | 463 | 0 | 29 |
| 388 | 10 | 29 | 407 | 2 | 22 | 426 | 2 | 24 | 445 | 4 | 29 | 464 | 0 | 30 |

Figure 13c

| X | $m_0$ | $m_1$ | X | $m_0$ | $m_1$ | X | $m_0$ | $m_1$ | X | $m_0$ | $m_1$ | X | $m_0$ | $m_1$ |
|---|---|---|---|---|---|---|---|---|---|---|---|---|---|---|
| 0 | 0 | 1 | 37 | 21 | 23 | 74 | 15 | 18 | 111 | 2 | 6 | 148 | 16 | 22 |
| 1 | 1 | 2 | 38 | 20 | 22 | 75 | 16 | 19 | 112 | 1 | 5 | 149 | 15 | 21 |
| 2 | 2 | 3 | 39 | 19 | 21 | 76 | 17 | 20 | 113 | 0 | 4 | 150 | 14 | 20 |
| 3 | 3 | 4 | 40 | 18 | 20 | 77 | 18 | 21 | 114 | 0 | 5 | 151 | 13 | 19 |
| 4 | 4 | 5 | 41 | 17 | 19 | 78 | 19 | 22 | 115 | 1 | 6 | 152 | 12 | 18 |
| 5 | 5 | 6 | 42 | 16 | 18 | 79 | 20 | 23 | 116 | 2 | 7 | 153 | 11 | 17 |
| 6 | 6 | 7 | 43 | 15 | 17 | 80 | 21 | 24 | 117 | 3 | 8 | 154 | 10 | 16 |
| 7 | 7 | 8 | 44 | 14 | 16 | 81 | 22 | 25 | 118 | 4 | 9 | 155 | 9 | 15 |
| 8 | 8 | 9 | 45 | 13 | 15 | 82 | 23 | 26 | 119 | 5 | 10 | 156 | 8 | 14 |
| 9 | 9 | 10 | 46 | 12 | 14 | 83 | 24 | 27 | 120 | 6 | 11 | 157 | 7 | 13 |
| 10 | 10 | 11 | 47 | 11 | 13 | 84 | 25 | 28 | 121 | 7 | 12 | 158 | 6 | 12 |
| 11 | 11 | 12 | 48 | 10 | 12 | 85 | 26 | 29 | 122 | 8 | 13 | 159 | 5 | 11 |
| 12 | 12 | 13 | 49 | 9 | 11 | 86 | 27 | 30 | 123 | 9 | 14 | 160 | 4 | 10 |
| 13 | 13 | 14 | 50 | 8 | 10 | 87 | 26 | 30 | 124 | 10 | 15 | 161 | 3 | 9 |
| 14 | 14 | 15 | 51 | 7 | 9 | 88 | 25 | 29 | 125 | 11 | 16 | 162 | 2 | 8 |
| 15 | 15 | 16 | 52 | 6 | 8 | 89 | 24 | 28 | 126 | 12 | 17 | 163 | 1 | 7 |
| 16 | 16 | 17 | 53 | 5 | 7 | 90 | 23 | 27 | 127 | 13 | 18 | 164 | 0 | 6 |
| 17 | 17 | 18 | 54 | 4 | 6 | 91 | 22 | 26 | 128 | 14 | 19 | 165 | 0 | 7 |
| 18 | 18 | 19 | 55 | 3 | 5 | 92 | 21 | 25 | 129 | 15 | 20 | 166 | 1 | 8 |
| 19 | 19 | 20 | 56 | 2 | 4 | 93 | 20 | 24 | 130 | 16 | 21 | 167 | 2 | 9 |
| 20 | 20 | 21 | 57 | 1 | 3 | 94 | 19 | 23 | 131 | 17 | 22 | 168 | 3 | 10 |
| 21 | 21 | 22 | 58 | 0 | 2 | 95 | 18 | 22 | 132 | 18 | 23 | 169 | 4 | 11 |
| 22 | 22 | 23 | 59 | 0 | 3 | 96 | 17 | 21 | 133 | 19 | 24 | 170 | 5 | 12 |
| 23 | 23 | 24 | 60 | 1 | 4 | 97 | 16 | 20 | 134 | 20 | 25 | 171 | 6 | 13 |
| 24 | 24 | 25 | 61 | 2 | 5 | 98 | 15 | 19 | 135 | 21 | 26 | 172 | 7 | 14 |
| 25 | 25 | 26 | 62 | 3 | 6 | 99 | 14 | 18 | 136 | 22 | 27 | 173 | 8 | 15 |
| 26 | 26 | 27 | 63 | 4 | 7 | 100 | 13 | 17 | 137 | 23 | 28 | 174 | 9 | 16 |
| 27 | 27 | 28 | 64 | 5 | 8 | 101 | 12 | 16 | 138 | 24 | 29 | 175 | 10 | 17 |
| 28 | 28 | 29 | 65 | 6 | 9 | 102 | 11 | 15 | 139 | 25 | 30 | 176 | 11 | 18 |
| 29 | 29 | 30 | 66 | 7 | 10 | 103 | 10 | 14 | 140 | 24 | 30 | 177 | 12 | 19 |
| 30 | 28 | 30 | 67 | 8 | 11 | 104 | 9 | 13 | 141 | 23 | 29 | 178 | 13 | 20 |
| 31 | 27 | 29 | 68 | 9 | 12 | 105 | 8 | 12 | 142 | 22 | 28 | 179 | 14 | 21 |
| 32 | 26 | 28 | 69 | 10 | 13 | 106 | 7 | 11 | 143 | 21 | 27 | 180 | 15 | 22 |
| 33 | 25 | 27 | 70 | 11 | 14 | 107 | 6 | 10 | 144 | 20 | 26 | 181 | 16 | 23 |
| 34 | 24 | 26 | 71 | 12 | 15 | 108 | 5 | 9 | 145 | 19 | 25 | 182 | 17 | 24 |
| 35 | 23 | 25 | 72 | 13 | 16 | 109 | 4 | 8 | 146 | 18 | 24 | 183 | 18 | 25 |
| 36 | 22 | 24 | 73 | 14 | 17 | 110 | 3 | 7 | 147 | 17 | 23 | 184 | 19 | 26 |

Figure 14a

| X | $m_0$ | $m_1$ | X | $m_0$ | $m_1$ | X | $m_0$ | $m_1$ | X | $m_0$ | $m_1$ | X | $m_0$ | $m_1$ |
|---|---|---|---|---|---|---|---|---|---|---|---|---|---|---|
| 185 | 20 | 27 | 222 | 10 | 19 | 259 | 4 | 15 | 296 | 2 | 15 | 333 | 4 | 19 |
| 186 | 21 | 28 | 223 | 11 | 20 | 260 | 5 | 16 | 297 | 3 | 16 | 334 | 5 | 20 |
| 187 | 22 | 29 | 224 | 12 | 21 | 261 | 6 | 17 | 298 | 4 | 17 | 335 | 6 | 21 |
| 188 | 23 | 30 | 225 | 13 | 22 | 262 | 7 | 18 | 299 | 5 | 18 | 336 | 7 | 22 |
| 189 | 22 | 30 | 226 | 14 | 23 | 263 | 8 | 19 | 300 | 6 | 19 | 337 | 8 | 23 |
| 190 | 21 | 29 | 227 | 15 | 24 | 264 | 9 | 20 | 301 | 7 | 20 | 338 | 9 | 24 |
| 191 | 20 | 28 | 228 | 16 | 25 | 265 | 10 | 21 | 302 | 8 | 21 | 339 | 10 | 25 |
| 192 | 19 | 27 | 229 | 17 | 26 | 266 | 11 | 22 | 303 | 9 | 22 | 340 | 11 | 26 |
| 193 | 18 | 26 | 230 | 18 | 27 | 267 | 12 | 23 | 304 | 10 | 23 | 341 | 12 | 27 |
| 194 | 17 | 25 | 231 | 19 | 28 | 268 | 13 | 24 | 305 | 11 | 24 | 342 | 13 | 28 |
| 195 | 16 | 24 | 232 | 20 | 29 | 269 | 14 | 25 | 306 | 12 | 25 | 343 | 14 | 29 |
| 196 | 15 | 23 | 233 | 21 | 30 | 270 | 15 | 26 | 307 | 13 | 26 | 344 | 15 | 30 |
| 197 | 14 | 22 | 234 | 20 | 30 | 271 | 16 | 27 | 308 | 14 | 27 | 345 | 14 | 30 |
| 198 | 13 | 21 | 235 | 19 | 29 | 272 | 17 | 28 | 309 | 15 | 28 | 346 | 13 | 29 |
| 199 | 12 | 20 | 236 | 18 | 28 | 273 | 18 | 29 | 310 | 16 | 29 | 347 | 12 | 28 |
| 200 | 11 | 19 | 237 | 17 | 27 | 274 | 19 | 30 | 311 | 17 | 30 | 348 | 11 | 27 |
| 201 | 10 | 18 | 238 | 16 | 26 | 275 | 18 | 30 | 312 | 16 | 30 | 349 | 10 | 26 |
| 202 | 9 | 17 | 239 | 15 | 25 | 276 | 17 | 29 | 313 | 15 | 29 | 350 | 9 | 25 |
| 203 | 8 | 16 | 240 | 14 | 24 | 277 | 16 | 28 | 314 | 14 | 28 | 351 | 8 | 24 |
| 204 | 7 | 15 | 241 | 13 | 23 | 278 | 15 | 27 | 315 | 13 | 27 | 352 | 7 | 23 |
| 205 | 6 | 14 | 242 | 12 | 22 | 279 | 14 | 26 | 316 | 12 | 26 | 353 | 6 | 22 |
| 206 | 5 | 13 | 243 | 11 | 21 | 280 | 13 | 25 | 317 | 11 | 25 | 354 | 5 | 21 |
| 207 | 4 | 12 | 244 | 10 | 20 | 281 | 12 | 24 | 318 | 10 | 24 | 355 | 4 | 20 |
| 208 | 3 | 11 | 245 | 9 | 19 | 282 | 11 | 23 | 319 | 9 | 23 | 356 | 3 | 19 |
| 209 | 2 | 10 | 246 | 8 | 18 | 283 | 10 | 22 | 320 | 8 | 22 | 357 | 2 | 18 |
| 210 | 1 | 9 | 247 | 7 | 17 | 284 | 9 | 21 | 321 | 7 | 21 | 358 | 1 | 17 |
| 211 | 0 | 8 | 248 | 6 | 16 | 285 | 8 | 20 | 322 | 6 | 20 | 359 | 0 | 16 |
| 212 | 0 | 9 | 249 | 5 | 15 | 286 | 7 | 19 | 323 | 5 | 19 | 360 | 0 | 17 |
| 213 | 1 | 10 | 250 | 4 | 14 | 287 | 6 | 18 | 324 | 4 | 18 | 361 | 1 | 18 |
| 214 | 2 | 11 | 251 | 3 | 13 | 288 | 5 | 17 | 325 | 3 | 17 | 362 | 2 | 19 |
| 215 | 3 | 12 | 252 | 2 | 12 | 289 | 4 | 16 | 326 | 2 | 16 | 363 | 3 | 20 |
| 216 | 4 | 13 | 253 | 1 | 11 | 290 | 3 | 15 | 327 | 1 | 15 | 364 | 4 | 21 |
| 217 | 5 | 14 | 254 | 0 | 10 | 291 | 2 | 14 | 328 | 0 | 14 | 365 | 5 | 22 |
| 218 | 6 | 15 | 255 | 0 | 11 | 292 | 1 | 13 | 329 | 0 | 15 | 366 | 6 | 23 |
| 219 | 7 | 16 | 256 | 1 | 12 | 293 | 0 | 12 | 330 | 1 | 16 | 367 | 7 | 24 |
| 220 | 8 | 17 | 257 | 2 | 13 | 294 | 0 | 13 | 331 | 2 | 17 | 368 | 8 | 25 |
| 221 | 9 | 18 | 258 | 3 | 14 | 295 | 1 | 14 | 332 | 3 | 18 | 369 | 9 | 26 |

Figure 14b

| X | $m_0$ | $m_1$ | X | $m_0$ | $m_1$ | X | $m_0$ | $m_1$ | X | $m_0$ | $m_1$ | X | $m_0$ | $m_1$ |
|---|---|---|---|---|---|---|---|---|---|---|---|---|---|---|
| 370 | 10 | 27 | 389 | 2 | 21 | 408 | 1 | 21 | 427 | 1 | 23 | 446 | 2 | 27 |
| 371 | 11 | 28 | 390 | 3 | 22 | 409 | 0 | 20 | 428 | 0 | 22 | 447 | 3 | 28 |
| 372 | 12 | 29 | 391 | 4 | 23 | 410 | 0 | 21 | 429 | 0 | 23 | 448 | 4 | 29 |
| 373 | 13 | 30 | 392 | 5 | 24 | 411 | 1 | 22 | 430 | 1 | 24 | 449 | 5 | 30 |
| 374 | 12 | 30 | 393 | 6 | 25 | 412 | 2 | 23 | 431 | 2 | 25 | 450 | 4 | 30 |
| 375 | 11 | 29 | 394 | 7 | 26 | 413 | 3 | 24 | 432 | 3 | 26 | 451 | 3 | 29 |
| 376 | 10 | 28 | 395 | 8 | 27 | 414 | 4 | 25 | 433 | 4 | 27 | 452 | 2 | 28 |
| 377 | 9 | 27 | 396 | 9 | 28 | 415 | 5 | 26 | 434 | 5 | 28 | 453 | 1 | 27 |
| 378 | 8 | 26 | 397 | 10 | 29 | 416 | 6 | 27 | 435 | 6 | 29 | 454 | 0 | 26 |
| 379 | 7 | 25 | 398 | 11 | 30 | 417 | 7 | 28 | 436 | 7 | 30 | 455 | 0 | 27 |
| 380 | 6 | 24 | 399 | 10 | 30 | 418 | 8 | 29 | 437 | 6 | 30 | 456 | 1 | 28 |
| 381 | 5 | 23 | 400 | 9 | 29 | 419 | 9 | 30 | 438 | 5 | 29 | 457 | 2 | 29 |
| 382 | 4 | 22 | 401 | 8 | 28 | 420 | 8 | 30 | 439 | 4 | 28 | 458 | 3 | 30 |
| 383 | 3 | 21 | 402 | 7 | 27 | 421 | 7 | 29 | 440 | 3 | 27 | 459 | 2 | 30 |
| 384 | 2 | 20 | 403 | 6 | 26 | 422 | 6 | 28 | 441 | 2 | 26 | 460 | 1 | 29 |
| 385 | 1 | 19 | 404 | 5 | 25 | 423 | 5 | 27 | 442 | 1 | 25 | 461 | 0 | 28 |
| 386 | 0 | 18 | 405 | 4 | 24 | 424 | 4 | 26 | 443 | 0 | 24 | 462 | 0 | 29 |
| 387 | 0 | 19 | 406 | 3 | 23 | 425 | 3 | 25 | 444 | 0 | 25 | 463 | 1 | 30 |
| 388 | 1 | 20 | 407 | 2 | 22 | 426 | 2 | 24 | 445 | 1 | 26 | 464 | 0 | 30 |

Figure 14c

| X | $m_0$ | $m_1$ | X | $m_0$ | $m_1$ | X | $m_0$ | $m_1$ | X | $m_0$ | $m_1$ | X | $m_0$ | $m_1$ |
|---|---|---|---|---|---|---|---|---|---|---|---|---|---|---|
| 0 | 29 | 30 | 37 | 7 | 9 | 74 | 12 | 15 | 111 | 24 | 28 | 148 | 8 | 14 |
| 1 | 28 | 29 | 38 | 8 | 10 | 75 | 11 | 14 | 112 | 25 | 29 | 149 | 9 | 15 |
| 2 | 27 | 28 | 39 | 9 | 11 | 76 | 10 | 13 | 113 | 26 | 30 | 150 | 10 | 16 |
| 3 | 26 | 27 | 40 | 10 | 12 | 77 | 9 | 12 | 114 | 25 | 30 | 151 | 11 | 17 |
| 4 | 25 | 26 | 41 | 11 | 13 | 78 | 8 | 11 | 115 | 24 | 29 | 152 | 12 | 18 |
| 5 | 24 | 25 | 42 | 12 | 14 | 79 | 7 | 10 | 116 | 23 | 28 | 153 | 13 | 19 |
| 6 | 23 | 24 | 43 | 13 | 15 | 80 | 6 | 9 | 117 | 22 | 27 | 154 | 14 | 20 |
| 7 | 22 | 23 | 44 | 14 | 16 | 81 | 5 | 8 | 118 | 21 | 26 | 155 | 15 | 21 |
| 8 | 21 | 22 | 45 | 15 | 17 | 82 | 4 | 7 | 119 | 20 | 25 | 156 | 16 | 22 |
| 9 | 20 | 21 | 46 | 16 | 18 | 83 | 3 | 6 | 120 | 19 | 24 | 157 | 17 | 23 |
| 10 | 19 | 20 | 47 | 17 | 19 | 84 | 2 | 5 | 121 | 18 | 23 | 158 | 18 | 24 |
| 11 | 18 | 19 | 48 | 18 | 20 | 85 | 1 | 4 | 122 | 17 | 22 | 159 | 19 | 25 |
| 12 | 17 | 18 | 49 | 19 | 21 | 86 | 0 | 3 | 123 | 16 | 21 | 160 | 20 | 26 |
| 13 | 16 | 17 | 50 | 20 | 22 | 87 | 0 | 4 | 124 | 15 | 20 | 161 | 21 | 27 |
| 14 | 15 | 16 | 51 | 21 | 23 | 88 | 1 | 5 | 125 | 14 | 19 | 162 | 22 | 28 |
| 15 | 14 | 15 | 52 | 22 | 24 | 89 | 2 | 6 | 126 | 13 | 18 | 163 | 23 | 29 |
| 16 | 13 | 14 | 53 | 23 | 25 | 90 | 3 | 7 | 127 | 12 | 17 | 164 | 24 | 30 |
| 17 | 12 | 13 | 54 | 24 | 26 | 91 | 4 | 8 | 128 | 11 | 16 | 165 | 23 | 30 |
| 18 | 11 | 12 | 55 | 25 | 27 | 92 | 5 | 9 | 129 | 10 | 15 | 166 | 22 | 29 |
| 19 | 10 | 11 | 56 | 26 | 28 | 93 | 6 | 10 | 130 | 9 | 14 | 167 | 21 | 28 |
| 20 | 9 | 10 | 57 | 27 | 29 | 94 | 7 | 11 | 131 | 8 | 13 | 168 | 20 | 27 |
| 21 | 8 | 9 | 58 | 28 | 30 | 95 | 8 | 12 | 132 | 7 | 12 | 169 | 19 | 26 |
| 22 | 7 | 8 | 59 | 27 | 30 | 96 | 9 | 13 | 133 | 6 | 11 | 170 | 18 | 25 |
| 23 | 6 | 7 | 60 | 26 | 29 | 97 | 10 | 14 | 134 | 5 | 10 | 171 | 17 | 24 |
| 24 | 5 | 6 | 61 | 25 | 28 | 98 | 11 | 15 | 135 | 4 | 9 | 172 | 16 | 23 |
| 25 | 4 | 5 | 62 | 24 | 27 | 99 | 12 | 16 | 136 | 3 | 8 | 173 | 15 | 22 |
| 26 | 3 | 4 | 63 | 23 | 26 | 100 | 13 | 17 | 137 | 2 | 7 | 174 | 14 | 21 |
| 27 | 2 | 3 | 64 | 22 | 25 | 101 | 14 | 18 | 138 | 1 | 6 | 175 | 13 | 20 |
| 28 | 1 | 2 | 65 | 21 | 24 | 102 | 15 | 19 | 139 | 0 | 5 | 176 | 12 | 19 |
| 29 | 0 | 1 | 66 | 20 | 23 | 103 | 16 | 20 | 140 | 0 | 6 | 177 | 11 | 18 |
| 30 | 0 | 2 | 67 | 19 | 22 | 104 | 17 | 21 | 141 | 1 | 7 | 178 | 10 | 17 |
| 31 | 1 | 3 | 68 | 18 | 21 | 105 | 18 | 22 | 142 | 2 | 8 | 179 | 9 | 16 |
| 32 | 2 | 4 | 69 | 17 | 20 | 106 | 19 | 23 | 143 | 3 | 9 | 180 | 8 | 15 |
| 33 | 3 | 5 | 70 | 16 | 19 | 107 | 20 | 24 | 144 | 4 | 10 | 181 | 7 | 14 |
| 34 | 4 | 6 | 71 | 15 | 18 | 108 | 21 | 25 | 145 | 5 | 11 | 182 | 6 | 13 |
| 35 | 5 | 7 | 72 | 14 | 17 | 109 | 22 | 26 | 146 | 6 | 12 | 183 | 5 | 12 |
| 36 | 6 | 8 | 73 | 13 | 16 | 110 | 23 | 27 | 147 | 7 | 13 | 184 | 4 | 11 |

Figure 15a

| X | $m_0$ | $m_1$ | X | $m_0$ | $m_1$ | X | $m_0$ | $m_1$ | X | $m_0$ | $m_1$ | X | $m_0$ | $m_1$ |
|---|---|---|---|---|---|---|---|---|---|---|---|---|---|---|
| 185 | 3 | 10 | 222 | 11 | 20 | 259 | 15 | 26 | 296 | 15 | 28 | 333 | 11 | 26 |
| 186 | 2 | 9 | 223 | 10 | 19 | 260 | 14 | 25 | 297 | 14 | 27 | 334 | 10 | 25 |
| 187 | 1 | 8 | 224 | 9 | 18 | 261 | 13 | 24 | 298 | 13 | 26 | 335 | 9 | 24 |
| 188 | 0 | 7 | 225 | 8 | 17 | 262 | 12 | 23 | 299 | 12 | 25 | 336 | 8 | 23 |
| 189 | 0 | 8 | 226 | 7 | 16 | 263 | 11 | 22 | 300 | 11 | 24 | 337 | 7 | 22 |
| 190 | 1 | 9 | 227 | 6 | 15 | 264 | 10 | 21 | 301 | 10 | 23 | 338 | 6 | 21 |
| 191 | 2 | 10 | 228 | 5 | 14 | 265 | 9 | 20 | 302 | 9 | 22 | 339 | 5 | 20 |
| 192 | 3 | 11 | 229 | 4 | 13 | 266 | 8 | 19 | 303 | 8 | 21 | 340 | 4 | 19 |
| 193 | 4 | 12 | 230 | 3 | 12 | 267 | 7 | 18 | 304 | 7 | 20 | 341 | 3 | 18 |
| 194 | 5 | 13 | 231 | 2 | 11 | 268 | 6 | 17 | 305 | 6 | 19 | 342 | 2 | 17 |
| 195 | 6 | 14 | 232 | 1 | 10 | 269 | 5 | 16 | 306 | 5 | 18 | 343 | 1 | 16 |
| 196 | 7 | 15 | 233 | 0 | 9 | 270 | 4 | 15 | 307 | 4 | 17 | 344 | 0 | 15 |
| 197 | 8 | 16 | 234 | 0 | 10 | 271 | 3 | 14 | 308 | 3 | 16 | 345 | 0 | 16 |
| 198 | 9 | 17 | 235 | 1 | 11 | 272 | 2 | 13 | 309 | 2 | 15 | 346 | 1 | 17 |
| 199 | 10 | 18 | 236 | 2 | 12 | 273 | 1 | 12 | 310 | 1 | 14 | 347 | 2 | 18 |
| 200 | 11 | 19 | 237 | 3 | 13 | 274 | 0 | 11 | 311 | 0 | 13 | 348 | 3 | 19 |
| 201 | 12 | 20 | 238 | 4 | 14 | 275 | 0 | 12 | 312 | 0 | 14 | 349 | 4 | 20 |
| 202 | 13 | 21 | 239 | 5 | 15 | 276 | 1 | 13 | 313 | 1 | 15 | 350 | 5 | 21 |
| 203 | 14 | 22 | 240 | 6 | 16 | 277 | 2 | 14 | 314 | 2 | 16 | 351 | 6 | 22 |
| 204 | 15 | 23 | 241 | 7 | 17 | 278 | 3 | 15 | 315 | 3 | 17 | 352 | 7 | 23 |
| 205 | 16 | 24 | 242 | 8 | 18 | 279 | 4 | 16 | 316 | 4 | 18 | 353 | 8 | 24 |
| 206 | 17 | 25 | 243 | 9 | 19 | 280 | 5 | 17 | 317 | 5 | 19 | 354 | 9 | 25 |
| 207 | 18 | 26 | 244 | 10 | 20 | 281 | 6 | 18 | 318 | 6 | 20 | 355 | 10 | 26 |
| 208 | 19 | 27 | 245 | 11 | 21 | 282 | 7 | 19 | 319 | 7 | 21 | 356 | 11 | 27 |
| 209 | 20 | 28 | 246 | 12 | 22 | 283 | 8 | 20 | 320 | 8 | 22 | 357 | 12 | 28 |
| 210 | 21 | 29 | 247 | 13 | 23 | 284 | 9 | 21 | 321 | 9 | 23 | 358 | 13 | 29 |
| 211 | 22 | 30 | 248 | 14 | 24 | 285 | 10 | 22 | 322 | 10 | 24 | 359 | 14 | 30 |
| 212 | 21 | 30 | 249 | 15 | 25 | 286 | 11 | 23 | 323 | 11 | 25 | 360 | 13 | 30 |
| 213 | 20 | 29 | 250 | 16 | 26 | 287 | 12 | 24 | 324 | 12 | 26 | 361 | 12 | 29 |
| 214 | 19 | 28 | 251 | 17 | 27 | 288 | 13 | 25 | 325 | 13 | 27 | 362 | 11 | 28 |
| 215 | 18 | 27 | 252 | 18 | 28 | 289 | 14 | 26 | 326 | 14 | 28 | 363 | 10 | 27 |
| 216 | 17 | 26 | 253 | 19 | 29 | 290 | 15 | 27 | 327 | 15 | 29 | 364 | 9 | 26 |
| 217 | 16 | 25 | 254 | 20 | 30 | 291 | 16 | 28 | 328 | 16 | 30 | 365 | 8 | 25 |
| 218 | 15 | 24 | 255 | 19 | 30 | 292 | 17 | 29 | 329 | 15 | 30 | 366 | 7 | 24 |
| 219 | 14 | 23 | 256 | 18 | 29 | 293 | 18 | 30 | 330 | 14 | 29 | 367 | 6 | 23 |
| 220 | 13 | 22 | 257 | 17 | 28 | 294 | 17 | 30 | 331 | 13 | 28 | 368 | 5 | 22 |
| 221 | 12 | 21 | 258 | 16 | 27 | 295 | 16 | 29 | 332 | 12 | 27 | 369 | 4 | 21 |

Figure 15b

| X | $m_0$ | $m_1$ | X | $m_0$ | $m_1$ | X | $m_0$ | $m_1$ | X | $m_0$ | $m_1$ | X | $m_0$ | $m_1$ |
|---|---|---|---|---|---|---|---|---|---|---|---|---|---|---|
| 370 | 3 | 20 | 389 | 9 | 28 | 408 | 9 | 29 | 427 | 7 | 29 | 446 | 3 | 28 |
| 371 | 2 | 19 | 390 | 8 | 27 | 409 | 10 | 30 | 428 | 8 | 30 | 447 | 2 | 27 |
| 372 | 1 | 18 | 391 | 7 | 26 | 410 | 9 | 30 | 429 | 7 | 30 | 448 | 1 | 26 |
| 373 | 0 | 17 | 392 | 6 | 25 | 411 | 8 | 29 | 430 | 6 | 29 | 449 | 0 | 25 |
| 374 | 0 | 18 | 393 | 5 | 24 | 412 | 7 | 28 | 431 | 5 | 28 | 450 | 0 | 26 |
| 375 | 1 | 19 | 394 | 4 | 23 | 413 | 6 | 27 | 432 | 4 | 27 | 451 | 1 | 27 |
| 376 | 2 | 20 | 395 | 3 | 22 | 414 | 5 | 26 | 433 | 3 | 26 | 452 | 2 | 28 |
| 377 | 3 | 21 | 396 | 2 | 21 | 415 | 4 | 25 | 434 | 2 | 25 | 453 | 3 | 29 |
| 378 | 4 | 22 | 397 | 1 | 20 | 416 | 3 | 24 | 435 | 1 | 24 | 454 | 4 | 30 |
| 379 | 5 | 23 | 398 | 0 | 19 | 417 | 2 | 23 | 436 | 0 | 23 | 455 | 3 | 30 |
| 380 | 6 | 24 | 399 | 0 | 20 | 418 | 1 | 22 | 437 | 0 | 24 | 456 | 2 | 29 |
| 381 | 7 | 25 | 400 | 1 | 21 | 419 | 0 | 21 | 438 | 1 | 25 | 457 | 1 | 28 |
| 382 | 8 | 26 | 401 | 2 | 22 | 420 | 0 | 22 | 439 | 2 | 26 | 458 | 0 | 27 |
| 383 | 9 | 27 | 402 | 3 | 23 | 421 | 1 | 23 | 440 | 3 | 27 | 459 | 0 | 28 |
| 384 | 10 | 28 | 403 | 4 | 24 | 422 | 2 | 24 | 441 | 4 | 28 | 460 | 1 | 29 |
| 385 | 11 | 29 | 404 | 5 | 25 | 423 | 3 | 25 | 442 | 5 | 29 | 461 | 2 | 30 |
| 386 | 12 | 30 | 405 | 6 | 26 | 424 | 4 | 26 | 443 | 6 | 30 | 462 | 1 | 30 |
| 387 | 11 | 30 | 406 | 7 | 27 | 425 | 5 | 27 | 444 | 5 | 30 | 463 | 0 | 29 |
| 388 | 10 | 29 | 407 | 8 | 28 | 426 | 6 | 28 | 445 | 4 | 29 | 464 | 0 | 30 |

Figure 15c

METHOD AND APPARATUS OF TELECOMMUNICATIONS

RELATED APPLICATIONS

This patent application is a continuation of PCT International Application No. PCT/CN2008/071936 filed on Aug. 8, 2008.

TECHNICAL FIELD

The present invention relates to telecommunications, and particularly, to technology of generating codewords and determining an information symbol from a codeword for transmission in a telecommunication system.

BACKGROUND

FIG. 1 illustrates a base station (101) of a cellular communication system covering cell 1 (102) and cell 2 (103), and user equipment (104). A cell is an area of radio coverage of a base station and each base station covers one or more cells by one or more antennas (105), (106). The cell is identified by a cell identity.

In most telecommunication systems, when a user terminal initializes access to the system, it initially determines the time synchronization, including the symbol timing and the frame timing, the frame comprising several symbols. In an example 3GPP cellular system, the symbol timing is obtained from detecting a primary synchronization signal, which is transmitted via the Primary Synchronization Channel P-SCH, whereas the frame timing is determined by decoding a secondary synchronization signal transmitted via the Secondary Synchronization Channel S-SCH. The secondary synchronization signal also typically conveys information about a cell identity or a cell group identity. A cell group identity identifies a group of one or more cells.

In a cellular communication system, such as an Orthogonal Frequency Division Multiplex OFDM system, symbols are transmitted in radio frames. In an example OFDM system, the time interval of the radio frames is 10 ms and the synchronization symbols are placed equidistantly 5 ms apart. Ability to determine frame timing and cell specific information from a single S-SCH symbol may be required. In a further example 3GPP system, two secondary synchronization code SSC sequences are multiplexed in an S-SCH symbol. The SSC sequences are taken from a set of 31 m-sequences and cell-specific scrambling is applied. Indices $m_0$ and $m_1$ of two SSC sequences in an S-SCH symbol can be regarded as representing elements of a codeword of length 2. Each such S-SCH codeword is denoted by $[m_0, m_1]$.

In an E-UTRA system, a code design is adopted with the following specified code construction to map a cell group ID, $N_{ID}$ to codeword elements:

$$m_0 = m' \bmod 31 \qquad (0)$$
$$m_1 = (m_0 + \lfloor m'/31 \rfloor + 1) \bmod 31$$
$$m' = N_{ID} + q(q+1)/2,$$
$$q = \left\lfloor \frac{N_{ID} + q'(q'+1)/2}{30} \right\rfloor, q' = \lfloor N_{ID}/30 \rfloor,$$

where $0 \leq N_{ID} \leq 167$.

The code construction for encoding group IDs in the prior art generates codewords for $0 \leq N_{ID} \leq 167$, which satisfy $m_0 \leq m_1$.

SUMMARY

A telecommunication system may require enlargement of a codeword set. For example, additional new cell IDs or cell group IDs may need to be encoded to the codewords. Furthermore, the codewords could also be required to carry other type of cell-specific information, e.g., antenna configuration or to carry other potential information, in which case the number of codewords also has to increase.

In a preferred embodiment of the present invention, a method of generating one or more codewords for transmission in a telecommunication system is provided, the one or more codeword comprising codeword elements $m_0$ and $m_1$. In accordance with the embodiment, the one or more codewords are generated corresponding to one or more lattice points represented by the codeword elements and the one or more codedwords are generated corresponding to one or more lattice points from at least one lattice diagonal for which $m_0 < m_1$. The number of the lattice diagonals is kept as small as possible given the number of the one or more codewords, for $0 \leq m_0 \leq L-1$, $0 \leq m_1 \leq L-1$, where L is a predefined nonnegative integer. L is a code alphabet size. The preferred method allows up to $L(L-1)/2$ codewords to be generated, which is the maximum number of codewords for which $m_0 < m_1$.

An apparatus for generating one or more codewords for transmission in a telecommunication system is provided. The apparatus preferably comprises a processor configured to generate one or more codewords corresponding to one or more lattice points from at least one lattice diagonal for which $m_0 < m_1$, and the number of the lattice diagonals is kept as small as possible given the number of the one or more codewords.

Some other preferred embodiments of the present invention illustrate a method and apparatus of determining an information symbol from a codeword.

BRIEF DESCRIPTION OF THE DRAWINGS

FIG. 9 illustrates codewords generated according to a second embodiment of the invention for L=5;

FIG. 10 illustrates the codewords generated according to a third embodiment of the invention for L=5;

FIG. 11 illustrates the codewords generated according to a fourth embodiment of the invention for L=5;

FIGS. 12a-12c illustrate the codewords generated according to a first embodiment of the invention for L=31;

FIGS. 13a-13c illustrate the codewords generated according to a second embodiment of the invention for L=31;

FIGS. 14a-14c illustrate the codewords generated according to a third embodiment of the invention for L=31;

FIGS. 15a-15c illustrate the codewords generated according to a fourth embodiment of the invention for L=31;

DETAILED DESCRIPTION

Figure 1:
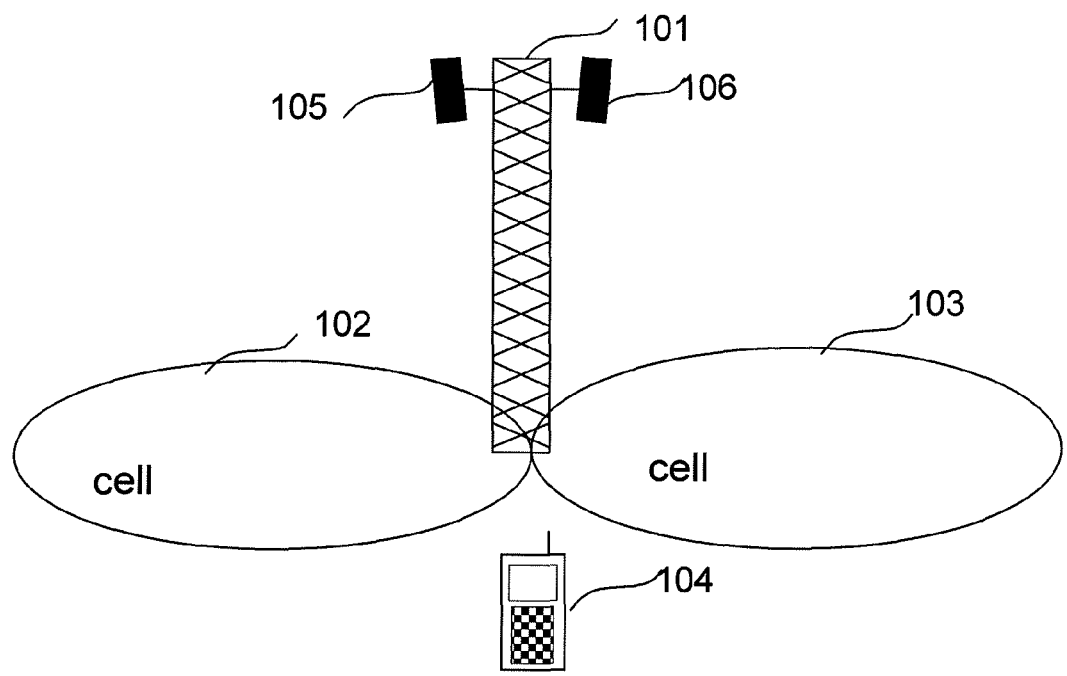
FIG. 1 illustrates a base station of a cellular communication system covering cell 1 and cell 2, and user equipment.

With reference to FIG. 1, at a cell boundary, a UE (104) may experience S-SCH signals of similar strengths, transmitted from the base station (101). If the UE (104) performs individual detection of the codeword elements, it is possible that it detects the two codeword elements from different cells. For example, if the base station (101) transmits codeword $[m_0^{(1)}, m_1^{(1)}]$ in cell 1 (102) and transmits codeword $[m_0^{(2)}, m_1^{(2)}]$ in cell 2 (103), the UE (104) may erroneously detect $[m_0^{(1)}, m_1^{(2)}]$ or $[m_0^{(2)}, m_1^{(1)}]$. This is called an ambiguity event.

To avoid ambiguity events, it is thus desirable that $[m_0^{(1)}, m_1^{(2)}]$ and $[m_0^{(2)}, m_1^{(1)}]$ are invalid codewords. Codewords for FT=0 are transmitted in one OFDM symbol and codewords for FT=1 are transmitted in another OFDM symbol of the same frame. Otherwise, neither cell 1 nor cell 2 are identified by the UE (104) but the wrong cell group identity and frame timing may be obtained from $[m_0^{(1)}, m_1^{(2)}]$ and $[m_0^{(2)}, m_1^{(1)}]$.

Figure 2:
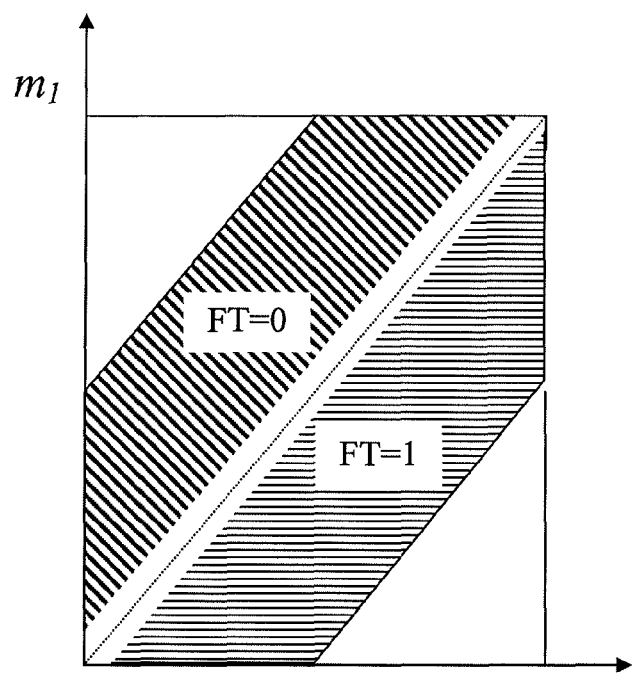
FIG. 2 illustrates codewords partitioning in a two-dimensional space.

FIG. 2 is a schematic diagram of codewords partitioning in a two-dimensional space. Codewords above the diagonal encode frame timing FT hypothesis 0 and codewords under the diagonal encode frame timing FT hypothesis 1. The code could therefore be constructed such that for a given S-SCH symbol, there is a relation $m_0 < m_1$ or $m_0 > m_1$ for all possible codewords of a particular FT hypothesis. A small distance between the codeword elements in a codeword $|m_0 - m_1|$ results in a diagonal codeword region.

Trying a straightforward extension of equation (0) provides codewords in a band similar to that of FIG. 2, FT=0, for $N_{ID} \leq 233$. However it is not capable of providing up to a maximum number of codewords while maintaining the band structure as illustrated in FIG. 2. If, e.g., $N_{ID}$=234 (notwithstanding greater than 167) were simply inserted into equation (0) for such an extension, it would correspond to $m_1 \geq m_0$.

An example code design criterion is to minimize the number of collision events. A collision event occurs when two code words share a codeword element, e.g., $[m_k, m_l]$ and $[m_k, m_n]$.

One example embodiment of the invention provides a method of generating one or more codewords for transmission in a cellular communication system. A codeword comprises codeword elements $m_0$ and $m_1$. Codeword elements $m_0$ and $m_1$ are nonnegative integers.

In the example embodiment, one or more codewords are generated corresponding to one or more lattice points represented by the codeword elements for a one-one correspondence between codewords and lattice points. The one or more codewords are generated corresponding to one or more lattice points from at least one lattice diagonal for which $m_0 < m_1$ and the number of the lattice diagonals is kept as small as possible given the number of the one or more codewords, for $0 \leq m_0 \leq L-1$, $0 \leq m_1 \leq L-1$, and L is a predefined nonnegative integer. For example, L is a code alphabet size. The method allows up to a maximum number of codewords for which $m_0 < m_1$ to be generated. This maximum number is $L(L-1)/2$.

One example advantage of embodiments of the invention is that the maximum number of codewords can be generated given the code alphabet size.

Home eNodeBs, for so called closed subscriber groups, CSGs, may require that either some of the current amount of cell IDs is reserved for Home eNodeBs, or that additional new cell IDs are dedicated to the Home eNodeB. Hence the latter case necessitates encoding of larger number of cell group IDs, which can be done by adding more codeword to the S-SCH.

Generating codewords capable of providing frame timing and allowing up to a maximum number of codewords satisfies the demand for increasing the number of codewords.

The codeword can be provided by arranging the codeword elements in different order, such as $[m_0, m_1]$ or $[m_1, m_0]$. In one example application, the codeword elements $m_0$ and $m_1$ correspond m-sequences taken from a set of m-sequences and the number of m-sequences in the set is L. This does not exclude application of representing some other type of sequences by the codeword elements, such as Golay sequences, Hadamard sequences and Zadoff-Chu sequences.

Figure 3:
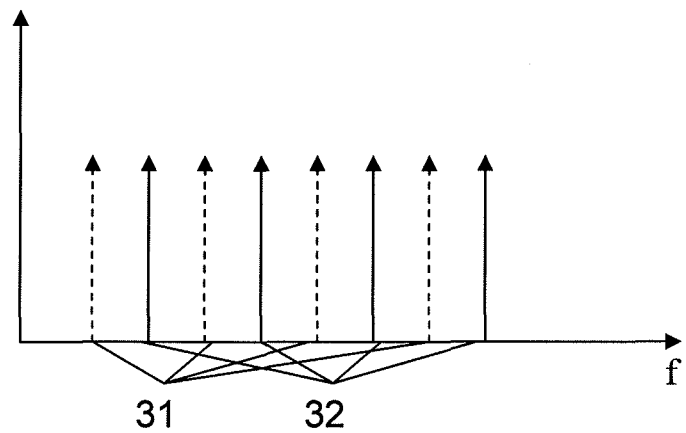
FIG. 3 illustrates codeword elements being transmitted by sets of sub-carriers interleaved in a frequency range according to an embodiment of the invention.
Figure 4:
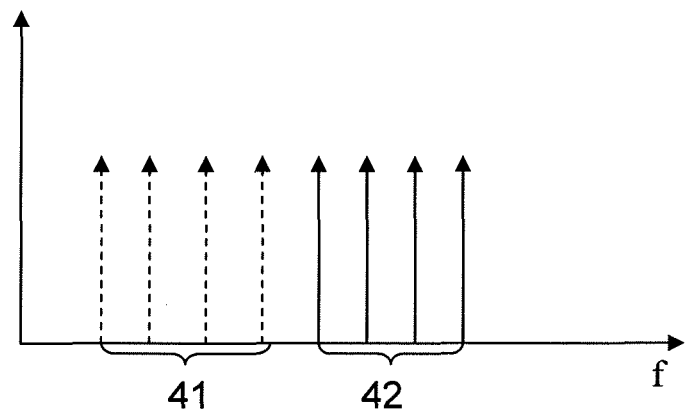
FIG. 4 illustrates codeword elements being transmitted by sets of sub-carriers using different frequency ranges according to an embodiment of the invention.

As illustrated in FIGS. 3 and 4, in a radio communication system, the codeword sequences are preferably transmitted by some sets of radio sub-carriers. In an example OFDM system, a sequence corresponding to $m_0$ is transmitted by a first set of sub-carriers (31), (41) and a sequence corresponding to $m_1$ are transmitted by a second set of sub-carriers (32), (42). In FIG. 3, example sub-carriers (31), (32) of different sets corresponding to $m_0$, and $m_1$, respectively, are preferably interleaved in frequency domain. FIG. 4 illustrates example sub-carriers (41), (42) of different sets, the respective sets of subcarriers transmitting $m_0$, and $m_1$, and being allocated consecutively in frequency domain.

Figure 5:
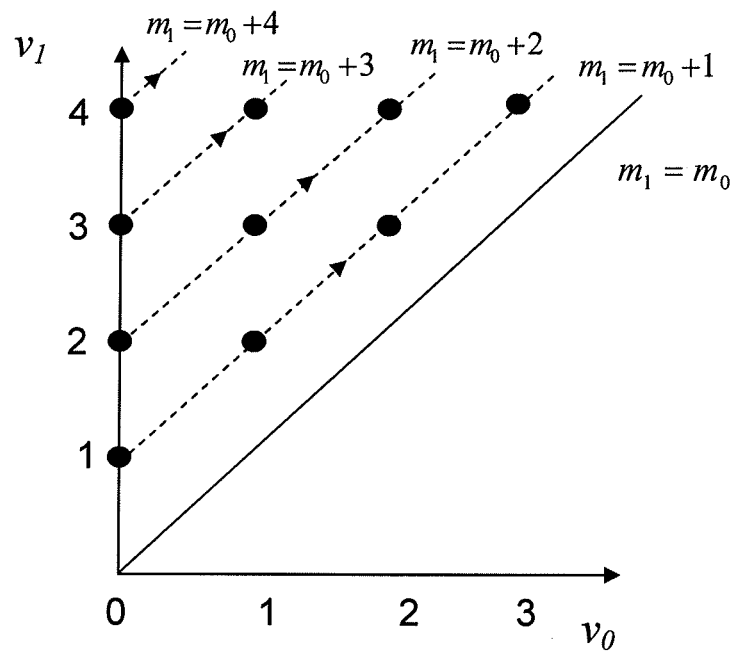
FIG. 5 illustrates codewords generated in a straight direction for L=5 according to an embodiment of the invention.

FIG. 5 illustrates codewords generated in a straight direction for L=5 according to an embodiment of the invention. The dots represent the lattice points, i.e., the codewords.

The codewords are generated corresponding to lattice points. Example lattice points for a discrete subgroup of the Euclidean space encompass the subgroup $\{m_0 v_0 + m_1 v_1\}$, where $m_0$ and $m_1$ are integers and $v_0$ and $v_1$ are linearly independent vectors. Given two such vectors $v_0$ and $v_1$, each lattice point can be uniquely represented by the two codeword elements $m_0$ and $m_1$. Furthermore, a set of lattice points, $S_k$, for an integer k is defined according to $S_k = \{(m_0, m_1) : m_1 = m_0 + k\}$.

For each integer k, we may refer to $S_k$ as a lattice diagonal or a kth lattice diagonal. For k=0, we refer to the lattice diagonal as the main lattice diagonal. The main lattice diagonal comprises lattice points for which $m_0 = m_1$. For k>0, we may refer to the lattice diagonal as the k:th lattice super-diagonal. The kth lattice super-diagonal comprises lattice points for which $m_0<m_1$. For k<0, we may refer to the lattice diagonal as the k:th lattice sub-diagonal. The kth lattice sub-diagonal comprises lattice points for which $m_0>m_1$. Codewords are preferably generated close to the main lattice diagonal, until sufficient number of codewords has been obtained.

To minimize the occurrence of ambiguity events, preferably codewords are defined using the whole range of $m_0$- and $m_1$-values and are allocated as close as possible to the main lattice diagonal for which $m_0=m_1$. A small distance between the codeword elements in a codeword $|m_0-m_1|$ results in a diagonal codeword region, an example of which is illustrated in FIG. 2. This may render some of the ambiguous codewords to be outside the codeword region. To minimize the occurrence of collision events, the diagonal codeword region preferably utilizes the whole range of $m_0$ and $m_1$ values.

When allocating codewords corresponding to the lattice points of one or more lattice diagonals, the codewords allocation could be represented by an ordering along the lattice diagonals.

As illustrated in FIG. 5, for the first lattice super-diagonal, k equals 1 and $m_1$ is generated according to $m_1=m_0+1$. For the code alphabet size L=5, the values of $m_0$ and $m_1$ are less than 5. Therefore, the codewords generated from the first lattice super-diagonal are [0, 1], [1, 2], [2, 3], [3, 4]. Then, k is increased by one for the second lattice super-diagonal, i.e. k=2, and a new set of codewords [0, 2], [1, 3], [2, 4] are generated. As illustrated in FIG. 5, all the codewords are taken from each lattice super-diagonal in a straight direction from the lower left to the upper right. The offset k ranges from 1 to 4 for generating the maximum number of codewords. The maximum number of codewords for which $m_0<m_1$ can be generated is $L(L-1)/2=10$. Considering the maximum number of codewords for which $m_0<m_1$, all the codewords that can be generated are [0, 1], [1, 2], [2, 3], [3, 4], [0, 2], [1, 3], [2, 4], [0, 3], [1, 4], and [0, 4].

The codewords can also be taken from each lattice super-diagonal in a reverse direction from the upper right to the lower left. For example, on the first lattice super-diagonal, codewords generated are [3, 4], [2, 3], [1, 2], [0, 1]. Considering the maximum number of codewords for which $m_0<m_1$, all the codewords that can be generated are the same as above. Though, for less than the maximum number of codewords, the sets of codewords may not be identical.

Figure 6:
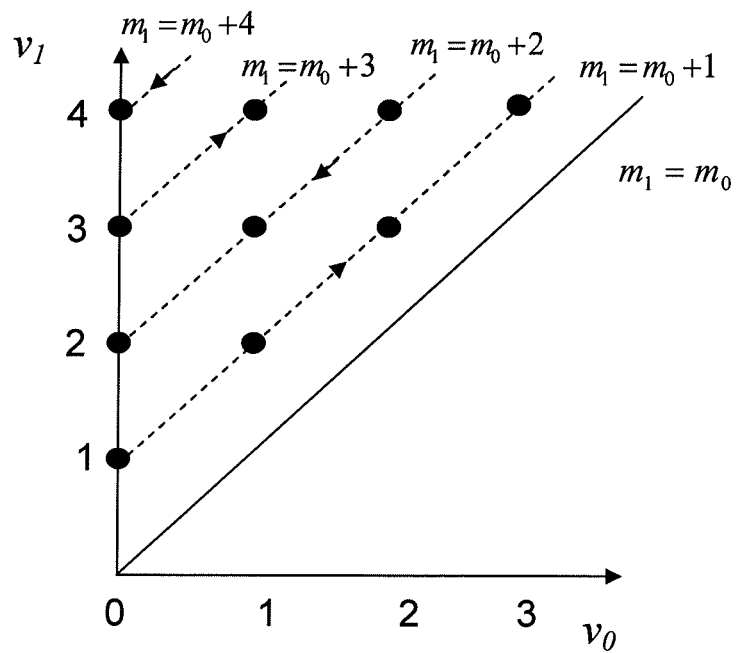
FIG. 6 illustrates codewords generated in a zig-zag direction for L=5 according to an embodiment of the invention.

FIG. 6 illustrates codewords are taken in a zig-zag direction for L=5 according to another embodiment.

In this embodiment, codewords are taken from each odd lattice super-diagonal in a direction from the lower left to the upper right and taken from each even lattice super-diagonal in a direction from the upper right to the lower left. For the first lattice super-diagonal, the integer k equals 1 and $m_1$ is generated according to $m_1=m_0+1$. The codewords are taken in a direction from the lower left to the upper right. Therefore, the codewords generated from the first lattice super-diagonal are [0, 1], [1, 2], [2, 3], [3, 4]. Then, k is increased by one for the second lattice super-diagonal, i.e. and the codewords are taken in a direction from the upper right to the lower left. Therefore, the codewords generated from the second lattice super-diagonal are [2, 4], [1, 3], [0, 2].

The codewords also can be taken from each odd lattice super-diagonal in a direction from the upper right to the lower left and taken from each even lattice super-diagonal in a direction from the lower left to the upper right.

In the above embodiments, a subset of codewords is generated, and the number of the lattice super-diagonals is kept as small as possible given the number of the codewords. As FIG. 5 and FIG. 6 show, the maximum number of codewords can be generated. If a number of codewords smaller than the maximum number is generated, e.g. codewords are generated from the first two lattice super-diagonals, a diagonal codeword region as depicted in FIG. 2 is obtained, which assures low ambiguity and collision occurrence.

In a cellular telecommunication system, information, such as cell specific information and antenna configuration, can be encoded into a codeword.

In the following embodiments, example methods of encoding an information symbol X into a codeword are provided. The information symbol X may be cell specific information, such as a cell identity or a cell group identity. X is an integer and $$0 \le X \le \frac{L(L-1)}{2} - 1$$

for code alphabet size L.

To prevent or minimize the risk of erroneous decoding in a cellular system, codewords are preferably selected not to include $[m_0^{(1)}, m_1^{(2)}]$ or $[m_0^{(2)}, m_1^{(1)}]$ as valid codewords.

Figures 7, 8:
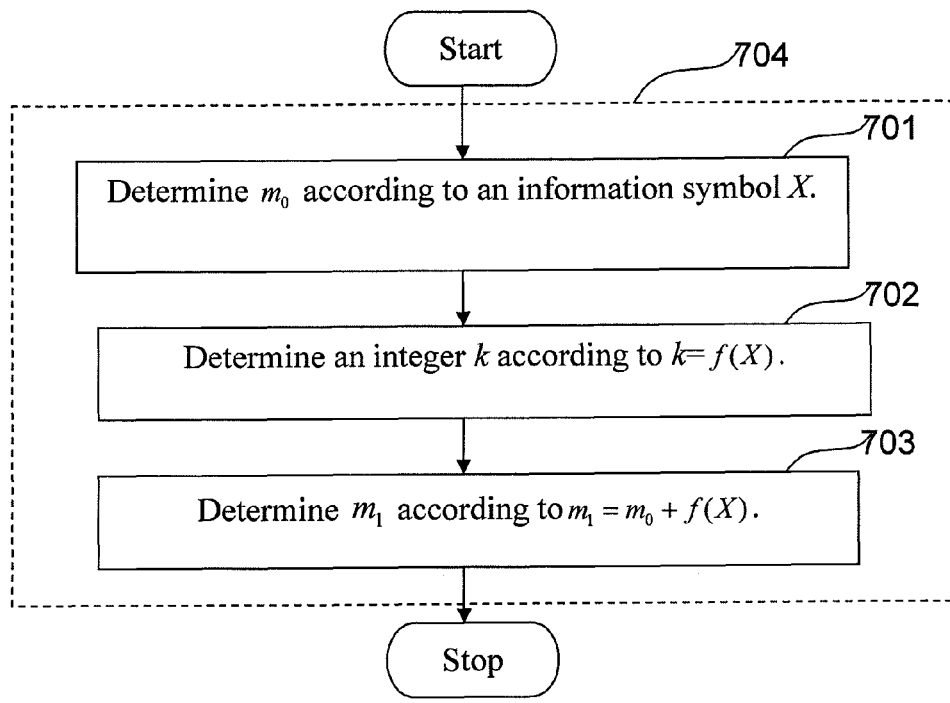
FIG. 7 is the flowchart of encoding an information symbol X into a codeword according to a preferred embodiment of the invention.
FIG. 8 illustrates codewords generated according to a first embodiment of the invention for L=5.

FIG. 7 is a flowchart of example encoding of an information symbol X into a codeword that, depending on applied (702), (703) function $f(X)$, may provide a one-one correspondence between information symbols and codewords. In the embodiment, $m_0$ is determined according to an information symbol X (701), an integer k is determined (702) according to $k=f(X)$, and $m_1$ is determined (703) according to $m_1=m_0+f(X)$.

The codeword elements $m_0, m_1$ can also be determined (704) without regard of order. The codeword elements are then preferably determined directly from the information symbol X without intermediary determining of an integer k.

An offset from a lattice diagonal for which $m_0=m_1$ to the lattice diagonal of the codeword is represented by an information dependent integer k, being generated according to $k=f(X)$, where $f(X)$ is some suitable function for assigning information symbols to particular one or more sets of lattice points. The function $f(X)$ is preferably generated from a number sequence. Such a number sequence is $$\underbrace{1, 1, \ldots, 1}_{L-1}, \underbrace{2, 2, \ldots, 2}_{L-2}, \ldots, \underbrace{L-1}_{1}.$$

The number sequence can be expressed in closed form by representing each element of the sequence by a function $f(X)$ taking on integer values for different values of integer variable X. Various indices of elements of the number sequence correspond to integer values of X. A unit-step functions, $u(n)$, $$u(n) = \begin{cases} 1, & n \ge 0 \\ 0, & n < 0, \end{cases}$$

makes an example closed form expression read $$f(X) = \sum_{p=0}^{L-2} u\left(X - pL + \frac{p(p+1)}{2}\right), X = 0, 1, 2, \ldots, \frac{L(L-1)}{2} - 1.$$

Without involving the unit step function explicitly in a sum, the function ƒ(X) providing the abovementioned sequence and subsequences thereof for a given range of consecutive integer values, X, may be defined as $$f(X) = \begin{cases} 1, & X = 0, \ldots, L-2 \\ 2, & X = L-1, \ldots, 2L-4 \\ \vdots & \vdots \\ L-1, & X = \frac{L(L-1)}{2} - 1. \end{cases} \quad (1)$$

The function may equivalently be defined as $$f(X) = L - 1 - \left\lfloor \frac{\sqrt{1 + 8\left(\frac{L(L-1)}{2} - 1 - X\right)} - 1}{2} \right\rfloor, \quad (2)$$

for $0 \leq X < L(L-1)/2$, where $\lfloor r \rfloor$ denotes the greatest integer less than or equal to r, for a real number r.

In a first embodiment, information symbols are mapped to codewords by allocating codewords from each lattice super-diagonal to a next information symbol in a direction from the lower left to the upper right. Codeword element $m_0$ is determined linearly proportional to the value of information symbol X by mapping it onto a corresponding lattice point of a lattice super-diagonal by subtracting the number of codewords of lattice super-diagonals for which all codewords have been allocated. Therefore, $m_0$ and $m_1$ are preferably determined according to $$m_0 = X - \sum_{k=1}^{f(X)-1}(L-k) \quad (3)$$
$$= X - (f(X) - 1)(L - f(X)/2),$$
$$m_1 = X - (f(X) - 1)(L - f(X)/2) + f(X). \quad (4)$$

FIG. 8 illustrates the codewords generated according to the first embodiment for example code alphabet size L=5.

In a second embodiment, codewords are allocated to a next information symbol from each lattice super-diagonal in a direction from the upper right to the lower left. Therefore, $m_0$ and $m_1$ are determined according to $$m_0 = \sum_{k=1}^{f(X)}(L-k) - 1 - X \quad (5)$$
$$= f(X)L - f(X)(1 + f(X))/2 - 1 - X,$$
$$m_1 = f(X)L - f(X)(1 + f(X))/2 - 1 - X + f(X). \quad (6)$$

FIG. 9 illustrates the codewords generated according to the second embodiment for example code alphabet size L=5.

In a third embodiment, codewords are allocated to a next information symbol from each odd lattice super-diagonal in a direction from the lower left to the upper right and from each even lattice super-diagonal in a direction from the upper right to the lower left. Therefore, $m_0$ and $m_1$ are determined according to $$m_0 = \begin{cases} X - (f(X) - 1)(L - f(X)/2), & f(X) \text{ odd} \\ f(X)L - f(X)(1 + f(X))/2 - 1 - X, & f(X) \text{ even}, \end{cases} \quad (7)$$

$$m_1 = \begin{cases} X - (f(X) - 1)(L - f(X)/2) + f(X), & f(X) \text{ odd} \\ f(X)L - f(X)(1 + f(X))/2 - 1 - X + f(X), & f(X) \text{ even}. \end{cases} \quad (8)$$

FIG. 10 illustrates codewords generated according to the third embodiment for example code alphabet size L=5.

In a fourth embodiment, codewords are allocated to a next information symbol from each odd lattice super-diagonal in a direction from the upper right to the lower left and from each even lattice super-diagonal in a direction from the upper right to the lower left. Therefore, $m_0$ and $m_1$ are determined according to $$m_0 = \begin{cases} f(X)L - f(X)(1 + f(X))/2 - 1 - X, & f(X) \text{ odd} \\ X - (f(X) - 1)(L - f(X)/2), & f(X) \text{ even}, \end{cases} \quad (9)$$

$$m_1 = \begin{cases} f(X)L - f(X)(1 + f(X))/2 - 1 - X + f(X), & f(X) \text{ odd} \\ X - (f(X) - 1)(L - f(X/2) + f(X), & f(X) \text{ even}. \end{cases} \quad (10)$$

FIG. 11 illustrates the codewords generated according to the fourth embodiment for example code alphabet size L=5.

In an example OFDM system, the code alphabet size L=31. The maximum of the codewords that can be generated, for which $m_0 < m_1$ is L(L−1)/2=465. The 465 codewords can uniquely represent 465 information symbols. In case the information symbol X is an identity, ID, such as a cell identity or a cell group identity, the 465 codewords can uniquely represent 465 IDs.

In a first embodiment, information symbols are mapped to codewords by allocating codewords to a next information symbol from lattice super-diagonals in a direction from the lower left to the upper right. The codewords are generated from equations 3 and 4. FIGS. 12a-12c illustrate the codewords generated according to the first embodiment for L=31.

In a second embodiment, codewords are allocated to a next information symbol from lattice super-diagonals in a direction from the upper right to the lower left. The codewords are generated from equations 5 and 6. FIGS. 13a-13c illustrate the codewords generated according to the second embodiment for L=31.

In a third embodiment, codewords are allocated to a next information symbol from each odd lattice super-diagonal in a direction from the lower left to the upper right and from each even lattice super-diagonal in a direction from the upper right to the lower left. The codewords are generated from equations 7 and 8. FIGS. 14a-14c illustrate the codewords generated according to the third embodiment for L=31.

In a fourth embodiment, the codewords are allocated to a next information symbol from each odd lattice super-diagonal in a direction from the upper right to the lower left and from each even lattice super-diagonal in a direction from the lower left to the upper right. The codewords are generated from equations 9 and 10. FIGS. 15a-15c illustrate the codewords generated according to the fourth embodiment for L=31.

According to some preferred embodiments, a first codeword is provided for a single information symbol, the codeword elements of the first codeword being in a first order and a second codeword is provided comprising the codeword elements in a second order. For example, the first codeword is $[m_0, m_1]$ and the second codeword is $[m_1, m_0]$. The different order of the codeword elements can then represent different information, such as different frame timing hypothesis.

In one embodiment, frame timing is encoded in to a codeword. Depending on frame timing hypothesis, a codeword $[m_0,m_1]$ is swapped to $[m_1,m_0]$. The swapping generates a new set of $L(L-1)/2$ unique codewords. Then, the codeword $[m_0,m_1]$ represents frame timing hypothesis 0 and the codeword $[m_1,m_0]$ represents frame timing hypothesis 1 or, alternatively, the codeword $[m_0,m_1]$ represents frame timing hypothesis 1 and the codeword $[m_1,m_0]$ represents frame timing hypothesis 0.

Preferably, the codeword $[m_0,m_1]$ is transmitted in one OFDM symbol of a frame and the codeword $[m_1,m_0]$ in another OFDM symbol of the frame.

However, swapping the codeword is not the only way to encode frame timing. According to other embodiments, the set of codewords are partitioned without any element swapping to encode frame timing.

Figure 16:
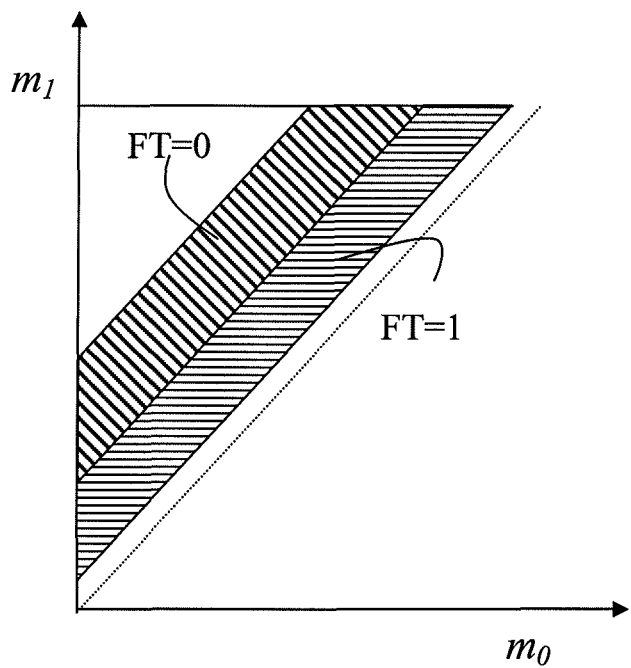
FIG. 16 illustrates an example partition of the set of codewords to encode frame timing according to an embodiment of the invention.

FIG. 16 is a schematic diagram illustrating an example partition of the set of codewords to encode frame timing. For example, the codewords in the lattice diagonals for which $1 \leq k \leq n_1$ represent frame timing hypothesis 1 and the codewords in the lattice diagonals for which $n_1+1 \leq k \leq n_2$ represent frame timing hypothesis 0. $n_1$, $n_2$ are predefined nonnegative integers and $n_1 < n_2 < L$.

Figure 17:
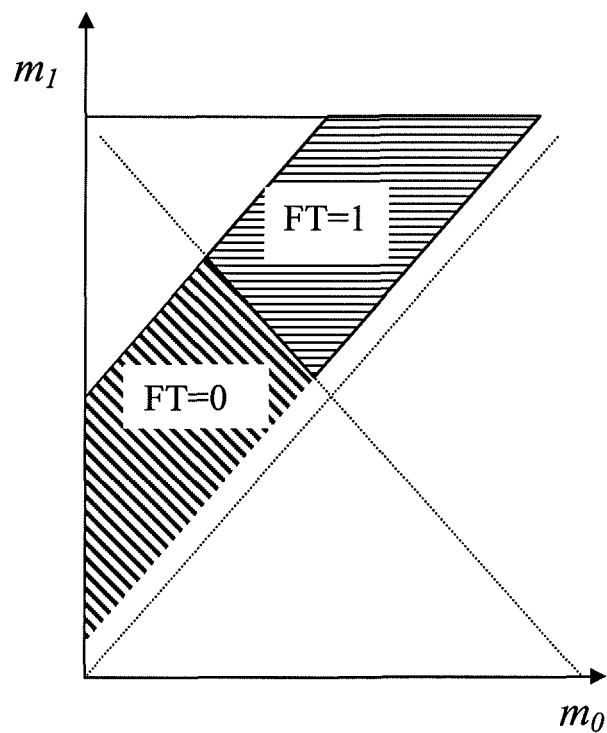
FIG. 17 illustrates another example partition of the set of codewords to encode frame timing according to an embodiment of the invention.

FIG. 17 is a schematic diagram illustrating another example partition of the set of codewords to encode frame timing. The codewords under the diagonal $m_0+m_1=L-1$ represent frame timing hypothesis 0 and the codewords above the diagonal $m_0+m_1=L-1$ represent frame timing hypothesis 1.

Other partitions of codewords to encode frame timing than those illustrated in FIG. 16 and FIG. 17 may also be considered.

The embodiment of the invention also provides a method of determining an information symbol X from a codeword generated according to the any of the above embodiments. The information symbol X is determined according to the codeword elements $m_0$ and $m_1$ of the codeword and the difference between $m_0$ and $m_1$.

Figure 18:
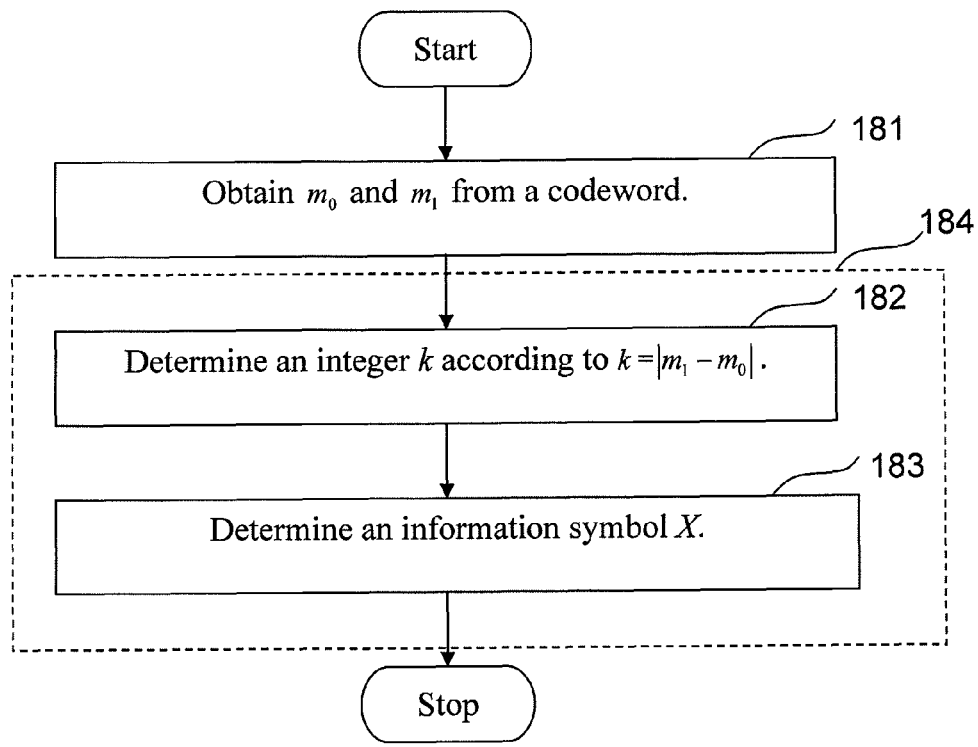
FIG. 18 is the flowchart of determining information symbol X from a codeword according to a preferred embodiment of the invention.

FIG. 18 is the flowchart of determining an information symbol X from a codeword according to an embodiment of the invention. After initially obtaining $m_0$ and $m_1$ from a codeword (181), an integer k is determined (182) according to $k=|m_1-m_0|$, and an information symbol X is determined (183) in relation to the mapping of information symbol to codeword of an encoder.

The information symbol X can also be determined (184) directly from the codeword elements $m_0,m_1$ without intermediary determining of an integer k.

If X is encoded into the codeword according to the first embodiment, the information symbol X is determined (183) according to $$X = \min\{m_0,m_1\}+(k-1)(L-k/2), \tag{11}$$

where $\min\{m_0,m_1\}$ denotes the smallest of $m_0$ and $m_1$. Equation 11 is symmetric in relation to $m_0$ and $m_1$ and interchanging the roles of $m_0$ and $m_1$ does not affect the information symbol X.

If X is encoded into the codeword according to the second embodiment, the information symbol X is determined (183) according to $$X = kL-k(1+k)/2-1-\min\{m_0,m_1\}, \tag{12}$$

where as before $\min\{m_0,m_1\}$ denotes the smallest of $m_0$ and $m_1$, $k=|m_1-m_0|$ and $|\cdot|$ denotes absolute value.

If X is encoded into the codeword according to the third embodiment, the information symbol X is determined (183) according to $$X = \begin{cases} \min\{m_0,m_1\}+(k-1)(L-k/2), & k \text{ even} \\ kL-k(1+k)/2-1-\min\{m_0,m_1\}, & k \text{ odd}, \end{cases} \tag{13}$$

where as before $\min\{m_0,m_1\}$ denotes the smallest of $m_0$ and $m_1$, $k=|m_1-m_0|$ and $|\cdot|$ denotes absolute value.

If X is encoded into the codeword according to the fourth embodiment, the information symbol X is determined (183) according to $$X = \begin{cases} kL-k(1+k)/2-1-\min\{m_0,m_1\}, & k \text{ even} \\ \min\{m_0,m_1\}+(k-1)(L-k/2), & k \text{ odd}, \end{cases} \tag{14}$$

where as before $\min\{m_0,m_1\}$ denotes the smallest of $m_0$ and $m_1$, $k=|m_1-m_0|$ and $|\cdot|$ denotes absolute value.

The embodiments of the invention also provide an apparatus for generating one or more codewords in a telecommunication system.

In one embodiment, the apparatus comprises a processor. The processor is configured to generate one or more codewords corresponding to one or more lattice points from at least one lattice diagonal for which $m_0<m_1$, allowing up to $L(L-1)/2$ codewords to be generated and the number of the lattice diagonals being as small as possible given the number of the one or more codewords.

Preferably, the processor of the apparatus is configured to encode an information symbol X into a codeword. In an example embodiment, X represents a cell identity or a cell group identity. As before, the information symbol X is an integer and preferably $$0 \leq X \leq \frac{L(L-1)}{2}-1.$$

Figure 19:
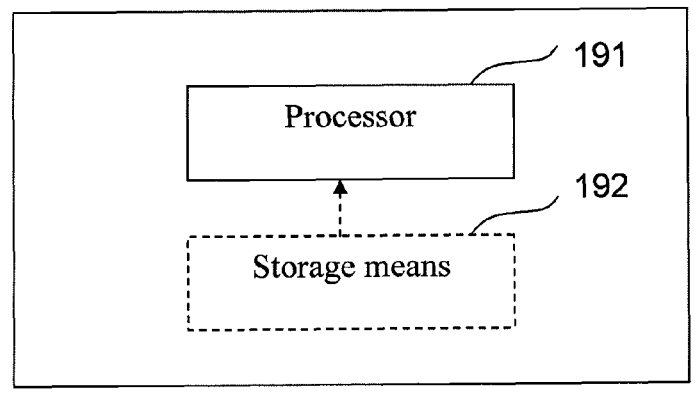
FIG. 19 illustrates a preferred apparatus for generating one or more codewords according to an embodiment of the invention.

FIG. 19 illustrates a preferred apparatus for generating one or more codewords.

In accordance with a first embodiment, the processor (191) is configured to determine an integer k according to equation 1 or 2 and determine $m_0$ and $m_1$ according to equations 3 and 4.

In accordance with a second embodiment, the processor (191) is configured to determine an integer k according to equation 1 or 2 and determine $m_0$ and $m_1$ according to equations 5 and 6.

In accordance with a third embodiment, the processor (191) is configured to determine an integer k according to equation 1 or 2 and determine $m_0$ and $m_1$ according to equations 7 and 8.

In accordance with a fourth embodiment, the processor (191) is configured to determine an integer k according to equation 1 or 2 and determine $m_0$ and $m_1$ according to equations 9 and 10.

In another embodiment, the apparatus further comprise storage means (192) configured to store the codewords or a subset of codewords illustrated in FIGS. 12a-12c. The storage means (192) can also store the codewords or a subset of codewords illustrated in FIGS. 13a-13c, FIGS. 14a-14c, or FIGS. 15a-15c. However, the storage means (192) need not be an essential part of the apparatus. Particularly for embodiments generating codewords from circuitry implementing closed form expressions such as those in equations 3-10, there is no need to store an entire codeword table for table lookup encoding, such as the example codeword tables in FIGS. 12-15.

Figure 20:
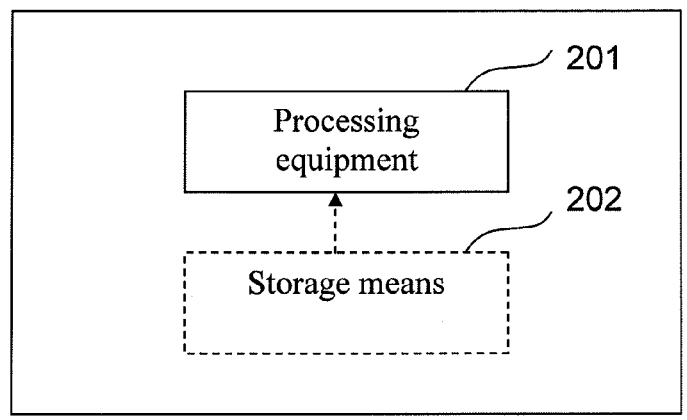
FIG. 20 illustrates a preferred decoder for determining information symbol X from a codeword according to an embodiment of the invention.

FIG. 20 is a schematic diagram illustrating a preferred decoder for determining information symbol X from a codeword. The decoder comprises a processing equipment (201), such as a processor, configured to determine the information symbol X according to the codeword elements $m_0$ and $m_1$ of the codeword and the difference between $m_0$ and $m_1$.

The information symbol X can be determined according to any of the equations 11, 12, 13 and 14.

In another embodiment, the decoder further comprises storage means (202) configured to store the codewords or a subset of codewords illustrated in FIGS. 12a-12c. The storage means (202) can also store the codewords or a subset of codewords illustrated in FIGS. 13a-13c, FIGS. 14a-14c, or FIGS. 15a-15c. The information symbol X may be determined according to the codewords stored in the storage means (202). However, the storage means (202) is not an essential part of the apparatus, when, e.g., embodied to operate according to closed form expressions such as any of the equations 11, 12, 13 and 14, eliminating the need of table lookup decoding.

According to an embodiment of the invention, a system for transmitting codewords in a cellular telecommunication system is provided. The system comprises at least two apparatuses. A first apparatus in the system transmits a first codeword uniquely representing a first information symbol and a second apparatus transmits a second codeword uniquely representing a second information symbol. Each of the first information symbol and the second information symbol is a cell identity or a cell group identity. The apparatus may be a base station or some other transmitter.

Figure 21:
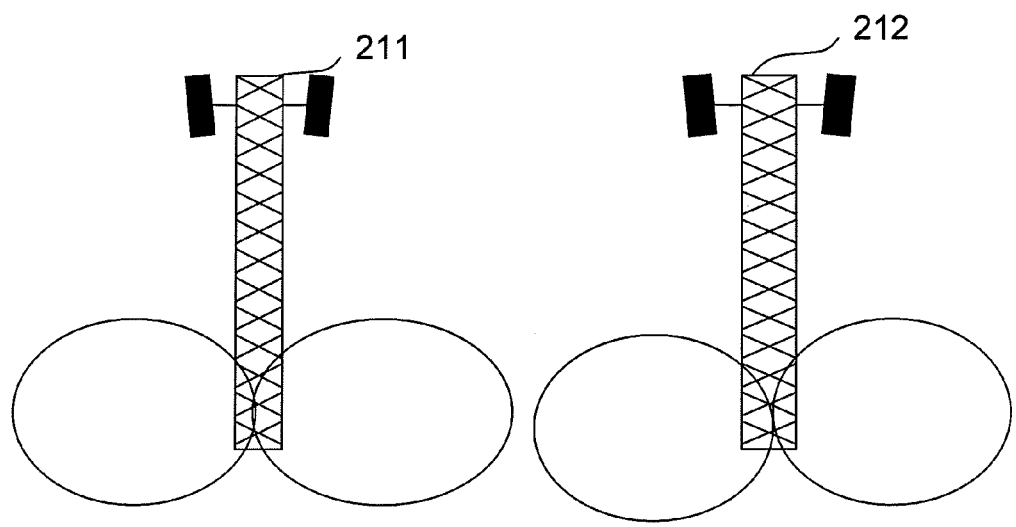
FIG. 21 illustrates a preferred system for transmitting codewords according to an embodiment of the invention.

FIG. 21 illustrates a preferred system for transmitting codewords in a cellular telecommunication system.

The system comprises a first base station (211) and a second base station (212). Each of the base stations covers one or more cells.

The base stations transmit codewords and each codeword uniquely represents a cell identity or a cell group identity. For example, the first base station (211) transmits a first codeword, a first cell group identity being encoded into the first codeword and the second base station (212) transmits a second codeword, a second cell group identity being encoded into the second codeword.

While several example embodiments have been provided in the present disclosure, it should be understood that the disclosed methods, apparatuses and systems might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, apparatuses, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope of independent claims.

The invention claimed is:

1. A method of generating at least one codeword for transmission in a telecommunication system, wherein the at least one codeword comprises codeword elements $m_0$ and $m_1$, and the method comprising generating by a base station, the at least one codeword corresponding to at least one lattice point represented by the codeword elements $m_0$ and $m_1$, where $m_0$ and $m_1$ are nonnegative integers;

encoding by the base station, an information symbol X into the at least one codeword, wherein: X is an integer which lies within a range:

$$0 \leq X \leq \frac{L(L-1)}{2} - 1.$$

and L is a predefined nonnegative integer indicating code alphabet size, and L is greater than 1;

transmitting by the base station, the generated at least one codeword to a user equipment, wherein the at least one codeword being generated corresponds to the at least one lattice point from at least one lattice diagonal for which $m_0 < m_1$, and a number of the at least one lattice diagonal is being kept as small as possible, but no less than 1, when given number of the at least one codeword; and wherein up to L(L-1)/2 codewords are to be generated;
where $0 \leq m_0 \leq L-1$, $0 \leq m_1 \leq L-1$;
wherein the codeword elements $m_0$ and $m_1$ of the codeword are determined according to at least one of:

$$\begin{cases} m_0 = X - (f(X)-1)(L-f(X)/2) \\ m_1 = X - (f(X)-1)(L-f(X)/2) + f(X); \end{cases}$$

$$\begin{cases} m_0 = f(X)L - f(X)(1+f(X))/2 - 1 - X \\ m_1 = f(X)L - f(X)(1+f(X))/2 - 1 - X + f(X); \end{cases}$$

$$\begin{cases} m_0 = \begin{cases} X - (f(X)-1)(L-f(X)/2), & f(X) \text{ odd} \\ f(X)L - f(X)(1+f(X))/2 - 1 - X, & f(X) \text{ even} \end{cases} \\ m_1 = \begin{cases} X - (f(X)-1)(L-f(X)/2) + f(X), & f(X) \text{ odd} \\ f(X)L - f(X)(1+f(X))/2 - 1 - X + f(X), & f(X) \text{ even}; \end{cases} \end{cases}$$

and $$\begin{cases} m_0 = \begin{cases} f(X)L - f(X)(1+f(X))/2 - 1 - X, & f(X) \text{ odd} \\ X - (f(X)-1)(L-f(X)/2), & f(X) \text{ even} \end{cases} \\ m_1 = \begin{cases} f(X)L - f(X)(1+f(X))/2 - 1 - X + f(X), & f(X) \text{ odd} \\ X - (f(X)-1)(L-f(X/2) + f(X), & f(X) \text{ even} \end{cases} \end{cases}$$

wherein $f(X)$ is an integer representing an offset from a lattice diagonal with $m_0 = m_1$ being the lattice diagonal of the codeword.

2. The method according to claim 1, wherein $f(X)$ is $$f(X) = \begin{cases} 1, & X = 0, \ldots, L-2 \\ 2, & X = L-1, \ldots, 2L-4 \\ \vdots & \vdots \\ L-1, & X = \frac{L(L-1)}{2} - 1. \end{cases}$$

3. The method according to claim 1, wherein $f(X)$ is $$f(X) = L - 1 - \left\lfloor \frac{\sqrt{1 + 8\left(\frac{L(L-1)}{2} - 1 - X\right)} - 1}{2} \right\rfloor,$$

where $\lfloor r \rfloor$ denotes the greatest integer not greater than r for a real number r.

4. The method according to claim 1, wherein the codeword elements are uniquely determined for an information symbol, X, from a subset of the codewords

| X | $m_0$ | $m_1$ |
|---|---|---|
| 0-29 | X | X + 1 |
| 30-58 | X-30 | X-28 |
| 59-86 | X-59 | X-56 |
| 87-113 | X-87 | X-83 |
| 114-139 | X-114 | X-109 |
| 140-164 | X-140 | X-134 |
| 165-188 | X-165 | X-158 |
| 189-211 | X-189 | X-181 |
| 212-233 | X-212 | X-203 |
| 234-254 | X-234 | X-224 |
| 255-274 | X-255 | X-244 |
| 275-293 | X-275 | X-263 |
| 294-311 | X-294 | X-281 |
| 312-328 | X-312 | X-298 |
| 329-344 | X-329 | X-314 |
| 345-359 | X-345 | X-329 |
| 360-373 | X-360 | X-343 |
| 374-386 | X-374 | X-356 |
| 387-398 | X-387 | X-368 |
| 399-409 | X-399 | X-379 |
| 410-419 | X-410 | X-389 |
| 420-428 | X-420 | X-398 |
| 429-436 | X-429 | X-406 |
| 437-443 | X-437 | X-413 |
| 444-449 | X-444 | X-419 |
| 450-454 | X-450 | X-424 |
| 455-458 | X-455 | X-428 |
| 459-461 | X-459 | X-431 |
| 462-463 | X-462 | X-433 |
| 464 | X-464 | X-434 | wherein the subset comprises codewords corresponding to at least 252 information symbols, X.

5. The method according to claim 4, wherein the subset comprises codewords corresponding to at least 336 information symbols, X.

6. The method according to claim 1, generating a first codeword for an information symbol, X, the codeword elements of the first codeword being in a first order, and providing a second codeword having the codeword elements of the first codeword in a second order different from the first order.

7. The method according to claim 6, wherein the first codeword is transmitted in a first OFDM symbol and the second codeword is transmitted in a second OFDM symbol in a frame.

8. The method according to claim 6, wherein the first and second order of the codeword elements represent different frame timing hypothesis.

9. The method according to claim 1, wherein the information symbol, X, represents information associated with the cell and is encoded into the codeword according to a one-one correspondence.

10. The method according to claim 1, wherein the codeword elements $m_0$ and $m_1$ correspond to m-sequences taken from a set of m-sequences and the number of m-sequences in the set is L.

11. The method according to claim 10, wherein a sequence according to $m_0$ is transmitted by a first set of OFDM sub-carriers and a sequence according to $m_1$ is transmitted by a second set of OFDM sub-carriers.

12. In a telecommunication system, a method of determining an information symbol X from a codeword comprising:
receiving, by a user equipment, the codeword from a base station; and
determining, by the user equipment, the information symbol X according to:
the codeword elements $m_0$ and $m_1$ of the codeword, and
the difference between $m_0$ and $m_1$, where $m_0$ and $m_1$ are nonnegative integers;
wherein the codeword elements $m_0$ and $m_1$ of the codeword are determined according to at least one of :

$$\begin{cases} m_0 = X - (f(X)-1)(L - f(X)/2) \\ m_1 = X - (f(X)-1)(L - f(X)/2) + f(X); \end{cases}$$

$$\begin{cases} m_0 = f(X)L - f(X)(1 + f(X))/2 - 1 - X \\ m_1 = f(X)L - f(X)(1 + f(X))/2 - 1 - X + f(X); \end{cases}$$

$$\begin{cases} m_0 = \begin{cases} X - (f(X)-1)(L - f(X)/2), & f(X) \text{ odd} \\ f(X)L - f(X)(1+f(X))/2 - 1 - X, & f(X) \text{ even} \end{cases} \\ m_1 = \begin{cases} X - (f(X)-1)(L - f(X)/2) + f(X), & f(X) \text{ odd} \\ f(X)L - f(X)(1+f(X))/2 - 1 - X + f(X), & f(X) \text{ even}; \end{cases} \end{cases}$$

and $$\begin{cases} m_0 = \begin{cases} f(X)L - f(X)(1+f(X))/2 - 1 - X, & f(X) \text{ odd} \\ X - (f(X)-1)(L - f(X)/2), & f(X) \text{ even} \end{cases} \\ m_1 = \begin{cases} f(X)L - f(X)(1+f(X))/2 - 1 - X + f(X), & f(X) \text{ odd} \\ X - (f(X)-1)(L - f(X/2) + f(X), & f(X) \text{ even} \end{cases} \end{cases}$$

where the value of $f(X)$ is an integer representing an offset from a lattice diagonal for which $m_0=m_1$ to a lattice diagonal of the codeword;
where L is a predefined nonnegative integer, L is greater than 1.

13. The method according to claim 12, wherein X is determined according to at least one of the following equations;

$$X = \min\{m_0, m_1\} + (k-1)(L - k/2);$$

$$X = kL - k(1+k)/2 - 1 - \min\{m_0, m_1\};$$

$$X = \begin{cases} \min\{m_0, m_1\} + (k-1)(L - k/2), & k \text{ even} \\ kL - k(1+k)/2 - 1 - \min\{m_0, m_1\}, & k \text{ odd}; \end{cases}$$

and $$X = \begin{cases} kL - k(1+k)/2 - 1 - \min\{m_0, m_1\}, & k \text{ even} \\ \min\{m_0, m_1\} + (k-1)(L - k/2), & k \text{ odd}; \end{cases}$$

$\min\{m_0, m_1\}$ defines the smallest value of $m_0$ and $m_1$; and $k=|m_1-m_0|$, the absolute value of $m_1-m_0$.

14. A base station for generating at least one codeword for transmission in a telecommunication system, wherein a codeword comprises two codeword elements $m_0$ and $m_1$, the base station comprises:
a processor, configured to:
generate at least one codeword corresponding to at least one lattice point from at least one lattice diagonal for which $m_0 < m_1$, allowing up to $(L-1)/2$ codewords to be generated, where L is greater than 1, and wherein a number of the at least one lattice diagonals being as small as possible, but no less than 1, when given a number of the at least one codeword;
encode an information symbol, X, into a codeword, wherein X is an integer and $$0 \leq X \leq \frac{L(L-1)}{2} - 1;$$

and
transmitting the generated at least one codeword to a user equipment;
where $m_0$ and $m_1$ are nonnegative integers, $0 \leq m_0 \leq L-1$, $0 \leq m_1 \leq L-1$ and L is a predefined nonnegative integer;
wherein the codeword elements $m_0$ and $m_1$ of the codeword are determined according to at least one of $$\begin{cases} m_0 = X - (f(X)-1)(L-f(X)/2) \\ m_1 = X - (f(X)-1)(L-f(X)/2) + f(X); \end{cases}$$

$$\begin{cases} m_0 = f(X)L - f(X)(1+f(X))/2 - 1 - X \\ m_1 = f(X)L - f(X)(1+f(X))/2 - 1 - X + f(X); \end{cases}$$

$$\begin{cases} m_0 = \begin{cases} X - (f(X)-1)(L-f(X)/2), & f(X) \text{ odd} \\ f(X)L - f(X)(1+f(X))/2 - 1 - X, & f(X) \text{ even} \end{cases} \\ m_1 = \begin{cases} X - (f(X)-1)(L-f(X)/2) + f(X), & f(X) \text{ odd} \\ f(X)L - f(X)(1+f(X))/2 - 1 - X + f(X), & f(X) \text{ even}; \end{cases} \end{cases}$$

and $$\begin{cases} m_0 = \begin{cases} f(X)L - f(X)(1+f(X))/2 - 1 - X, & f(X) \text{ odd} \\ X - (f(X)-1)(L-f(X)/2), & f(X) \text{ even} \end{cases} \\ m_1 = \begin{cases} f(X)L - f(X)(1+f(X))/2 - 1 - X + f(X), & f(X) \text{ odd} \\ X - (f(X)-1)(L-f(X/2) + f(X), & f(X) \text{ even} \end{cases} \end{cases}$$

where the value of $f(X)$ is an integer representing an offset from a lattice diagonal for which $m_0 = m_1$ to the lattice diagonal of the codeword.

15. The base station according to claim 14, comprising storage means for storing a subset of the codewords

| X | $m_0$ | $m_1$ |
|---|---|---|
| 0-29 | X | X + 1 |
| 30-58 | X-30 | X-28 |
| 59-86 | X-59 | X-56 |
| 87-113 | X-87 | X-83 |
| 114-139 | X-114 | X-109 |
| 140-164 | X-140 | X-134 |
| 165-188 | X-165 | X-158 |
| 189-211 | X-189 | X-181 |
| 212-233 | X-212 | X-203 |
| 234-254 | X-234 | X-224 |
| 255-274 | X-255 | X-244 |
| 275-293 | X-275 | X-263 |
| 294-311 | X-294 | X-281 |
| 312-328 | X-312 | X-298 |
| 329-344 | X-329 | X-314 |
| 345-359 | X-345 | X-329 |
| 360-373 | X-360 | X-343 |
| 374-386 | X-374 | X-356 |
| 387-398 | X-387 | X-368 |
| 399-409 | X-399 | X-379 |
| 410-419 | X-410 | X-389 |
| 420-428 | X-420 | X-398 |
| 429-436 | X-429 | X-406 |

-continued

| X | $m_0$ | $m_1$ |
|---|---|---|
| 437-443 | X-437 | X-413 |
| 444-449 | X-444 | X-419 |
| 450-454 | X-450 | X-424 |
| 455-458 | X-455 | X-428 |
| 459-461 | X-459 | X-431 |
| 462-463 | X-462 | X-433 |
| 464 | X-464 | X-434 | and the subset comprises codewords corresponding to at least 169 information symbols, X.

16. An user equipment for determining an information symbol X from a codeword, the user equipment comprises a processor, configured to:
receive the codeword from a base station; and
determine the information symbol, X, according to the codeword elements $m_0$ and $m_1$ of the codeword and the difference between $m_0$ and $m_1$;
wherein the codeword elements $m_0$ and $m_1$ of the codeword are determined according to at least one of $$\begin{cases} m_0 = X - (f(X)-1)(L-f(X)/2) \\ m_1 = X - (f(X)-1)(L-f(X)/2) + f(X); \end{cases}$$

$$\begin{cases} m_0 = f(X)L - f(X)(1+f(X))/2 - 1 - X \\ m_1 = f(X)L - f(X)(1+f(X))/2 - 1 - X + f(X); \end{cases}$$

$$\begin{cases} m_0 = \begin{cases} X - (f(X)-1)(L-f(X)/2), & f(X) \text{ odd} \\ f(X)L - f(X)(1+f(X))/2 - 1 - X, & f(X) \text{ even} \end{cases} \\ m_1 = \begin{cases} X - (f(X)-1)(L-f(X)/2) + f(X), & f(X) \text{ odd} \\ f(X)L - f(X)(1+f(X))/2 - 1 - X + f(X), & f(X) \text{ even}; \end{cases} \end{cases}$$

and $$\begin{cases} m_0 = \begin{cases} f(X)L - f(X)(1+f(X))/2 - 1 - X, & f(X) \text{ odd} \\ X - (f(X)-1)(L-f(X)/2), & f(X) \text{ even} \end{cases} \\ m_1 = \begin{cases} f(X)L - f(X)(1+f(X))/2 - 1 - X + f(X), & f(X) \text{ odd} \\ X - (f(X)-1)(L-f(X/2) + f(X), & f(X) \text{ even} \end{cases} \end{cases}$$

where the value of $f(X)$ is an integer representing an offset from a lattice diagonal for which $m_0 = m_1$ to a lattice diagonal of the codeword;
where L is a predefined nonnegative integer, L is greater than 1.

17. The apparatus user equipment according to claim 16, wherein X is determined according to at least one of the following equations;

$$X = \min\{m_0, m_1\} + (k-1)(L - k/2);$$

$$X = kL - k(1+k)/2 - 1 - \min\{m_0, m_1\};$$

$$X = \begin{cases} \min\{m_0, m_1\} + (k-1)(L - k/2), & k \text{ even} \\ kL - k(1+k)/2 - 1 - \min\{m_0, m_1\}, & k \text{ odd}; \end{cases}$$

and $$X = \begin{cases} kL - k(1+k)/2 - 1 - \min\{m_0, m_1\}, & k \text{ even} \\ \min\{m_0, m_1\} + (k-1)(L - k/2), & k \text{ odd}; \end{cases}$$

$\min\{m_0, m_1\}$ defines the smallest value of $m_0$ and $m_1$; and $k = |m_1 - m_0|$, the absolute value of $m_1 - m_0$.

* * * * *

UNITED STATES PATENT AND TRADEMARK OFFICE
CERTIFICATE OF CORRECTION

PATENT NO. : 8,451,938 B2
APPLICATION NO. : 13/023220
DATED : May 28, 2013
INVENTOR(S) : Fredrik Berggren Page 1 of 1

It is certified that error appears in the above-identified patent and that said Letters Patent is hereby corrected as shown below:

In the Claims

In column 16, claim 17, line 47, before "user equipment according to" delete "apparatus".

Signed and Sealed this
Twentieth Day of August, 2013

Teresa Stanek Rea
*Acting Director of the United States Patent and Trademark Office*